US011516052B2

(12) United States Patent
Kuang et al.

(10) Patent No.: US 11,516,052 B2
(45) Date of Patent: Nov. 29, 2022

(54) MOBILE TERMINAL AND BASE STATION INVOLVED IN DOWNLINK CHANNEL OPERATIONS INCLUDING RADIO CHANNEL ESTIMATION BASED ON DEMODULATION REFERENCE SIGNAL

(71) Applicant: Panasonic Intellectual Property Corporation of America, Torrance, CA (US)

(72) Inventors: Quan Kuang, Langen (DE); Hidetoshi Suzuki, Kanagawa (JP); Ming-Hung Tao, Frankfurt am Main (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 95 days.

(21) Appl. No.: 17/075,174

(22) Filed: Oct. 20, 2020

(65) Prior Publication Data

US 2021/0036829 A1 Feb. 4, 2021

Related U.S. Application Data

(63) Continuation of application No. PCT/EP2019/078174, filed on Oct. 17, 2019.

(30) Foreign Application Priority Data

Nov. 2, 2018 (EP) .................................... 18204189

(51) Int. Cl.
*H04L 25/02* (2006.01)
*H04L 5/00* (2006.01)
(Continued)

(52) U.S. Cl.
CPC .......... *H04L 25/023* (2013.01); *H04L 5/0023* (2013.01); *H04L 5/0051* (2013.01);
(Continued)

(58) Field of Classification Search
CPC ............. H04L 25/0202; H04L 25/0226; H04L 25/023; H04L 25/0232; H04L 25/0234;
(Continued)

(56) References Cited

U.S. PATENT DOCUMENTS

| 2014/0098795 A1* | 4/2014 | Takeda | H04L 27/2613 370/335 |
|---|---|---|---|
| 2016/0205669 A1* | 7/2016 | Kusashima | H04W 72/042 370/280 |

(Continued)

FOREIGN PATENT DOCUMENTS

WO 2018/030756 A1 2/2018

OTHER PUBLICATIONS

3GPP TR 38.913 V15.0.0, "3$^{rd}$ Generation Partnership Project; Technical Specification Group Radio Access Network; Study on Scenarios and Requirements for Next Generation Access Technologies; (Release 15)," Jun. 2018, 39 pages.

(Continued)

*Primary Examiner* — Joshua Kading
(74) *Attorney, Agent, or Firm* — Seed IP Law Group LLP

(57) ABSTRACT

The present disclosure relates to a mobile terminal, a base station and respective operation methods. The mobile terminal comprises circuitry, which in operation assumes that a base station is configured to use one of a plurality of transmission beams, receives a downlink control channel candidate and a corresponding demodulation reference signal using one of a plurality of reception beams corresponding to the assumed one of the plurality of transmission beams, performs channel estimation based on the received demodulation reference signal, and, depending on the quality, demodulates the downlink control channel candidate using the channel estimation. The channel estimation is performed using a demodulation reference signal sequence (Continued)

which is generated observing an association which is associating the generated sequence with the assumed one of the plurality of transmission beams such that at least two of the plurality of transmission beams are associated with different demodulation reference signal sequences.

14 Claims, 10 Drawing Sheets

(51) Int. Cl.
 *H04W 72/04* (2009.01)
 *H04W 72/12* (2009.01)
 *H04B 7/0408* (2017.01)
 *H04W 74/08* (2009.01)

(52) U.S. Cl.
 CPC ........ *H04L 25/024* (2013.01); *H04L 25/0224* (2013.01); *H04L 25/0228* (2013.01); *H04W 72/042* (2013.01); *H04W 72/1231* (2013.01); *H04W 72/1289* (2013.01); *H04B 7/0408* (2013.01); *H04W 74/0833* (2013.01)

(58) Field of Classification Search
 CPC ............. H04L 25/0236; H04L 25/0224; H04L 25/0228; H04L 25/024; H04L 25/0242; H04L 25/0244; H04L 25/0246; H04L 25/0248; H04L 25/025; H04L 25/0252; H04L 25/0254; H04L 25/0256; H04L 25/0258; H04L 5/0023; H04L 5/0051; H04W 72/042; H04W 72/085; H04W 72/1231; H04W 72/1289; H04W 74/0833; H04B 7/0408
 See application file for complete search history.

(56) References Cited

U.S. PATENT DOCUMENTS

| | | | |
|---|---|---|---|
| 2018/0176059 A1* | 6/2018 | Medles | H04W 72/042 |
| 2018/0205585 A1 | 7/2018 | Sadiq et al. | |
| 2020/0178279 A1* | 6/2020 | Frenne | H04W 72/1289 |
| 2020/0204315 A1* | 6/2020 | Zhao | H04L 5/0048 |
| 2020/0204335 A1* | 6/2020 | Kim | H04L 27/2646 |
| 2020/0235874 A1* | 7/2020 | Yeo | H04L 5/0048 |
| 2020/0336181 A1* | 10/2020 | Cao | H04B 7/0626 |
| 2021/0360523 A1* | 11/2021 | Hwang | H04W 72/14 |

OTHER PUBLICATIONS

3GPP TS 38.211 V15.2.0, "3$^{rd}$ Generation Partnership Project; Technical Specification Group Radio Access Network; NR; Physical channels and modulation (Release 15)," Jun. 2018, 96 pages.
3GPP TS 38.213 V15.2.0 "3$^{rd}$ Generation Partnership Project; Technical Specification Group Radio Access Network; NR; Physical layer procedures for control (Release 15)," Jun. 2018, 99 pages.
3GPP TS 38.331 V15.2.1, "3$^{rd}$ Generation Partnership Project; Technical Specification Group Radio Access Network; NR; Radio Resource Control (RRC) protocol specification (Release 15)," Jun. 2018, 303 pages.
Ericsson, Qualcomm, Huawei, Alcatel-Lucent, "Study on Licensed-Assisted Access using LTE," RP-141646, Agenda Item: 14.1.1, 3GPP TSG RAN Meeting #65, Edinburgh, Scotland, Sep. 9-12, 2014, 8 pages.
ETSI, "Broadband Radio Access Networks (BRAN); 5 GHz high performance RLAN; Harmonized EN covering the essential requirements of article 3.2 of the R&TTE Directive," ETSI EN 301 893 V1.8.1, Mar. 2015, 93 pages.
Extended European Search Report, dated Apr. 5, 2019, for European Application No. 18204189.7, 15 pages.
International Search Report, dated Dec. 16, 2019, for International Application No. PCT/EP2019/078174, 2 pages.
Qualcomm Incorporated, "Revised SID on NR-based Access to Unlicensed Spectrum," RP-172021, Agenda Item: 9.3.3, 3GPP TSG RAN Meeting #77, Sapporo, Japan, Sep. 11-14, 2017, 5 pages.

* cited by examiner

| TX beam index | DM-RS generating base sequence (e.g. 16-bits) |
|---|---|
| TX-beam #0 | 1001 1010 0110 1110 |
| TX-beam #1 | 1010 0110 0000 1000 |
| TX-beam #2 | 1000 0101 1100 0000 |
| TX-beam #3 | 1011 0000 1100 1010 |
| ... | ... |

Fig. 3

| TX beam index | DM-RS generating base sequence (e.g. 16-bits) | | |
|---|---|---|---|
| | PLMN ID | Cell ID | Beam ID |
| TX-beam #0 | 00101 | 10101 | 011 001 |
| TX-beam #1 | 00101 | 10101 | 011 010 |
| TX-beam #2 | 00101 | 10101 | 011 011 |
| TX-beam #3 | 00101 | 10101 | 011 100 |
| ... | | ... | |

Fig. 4

MOBILE TERMINAL AND BASE STATION INVOLVED IN DOWNLINK CHANNEL OPERATIONS INCLUDING RADIO CHANNEL ESTIMATION BASED ON DEMODULATION REFERENCE SIGNAL

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see e.g., section 6 of TR 38.913 version 15.0.0 incorporated herein by reference), at least including enhanced mobile broadband (eMBB), ultra-reliable low-latency communications (URLLC), massive machine type communication (mMTC).

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks.

The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing an improved procedure for the mobile terminal to perform downlink control channel receptions and an improved procedure for the base station to perform downlink control channel transmissions.

In one general first example, the techniques disclosed here feature a user equipment comprising a processing circuitry and transceiver. The processing circuitry assumes that a base station is configured to use for downlink control channel (PDCCH) and corresponding demodulation reference signal (DM-RS) transmissions to the mobile terminal one of a plurality of transmission beams (tx-beam #1). The transceiver receives a downlink control channel candidate (PDCCH candidate) and a corresponding demodulation reference signal (DM-RS) from the base station using one of a plurality of reception beams (rx-beam #1) corresponding to the assumed one of the plurality of transmission beams (tx-beam #1). The processing circuitry (130) performs radio channel estimation based on the received demodulation reference signal (DM-RS). The processing circuitry, depending on a radio channel estimation quality, demodulates the downlink control channel candidate (PDCCH candidate) using the radio channel estimation. The channel estimation is performed using a demodulation reference signal sequence which is generated observing an association which is associating the generated sequence with the assumed one of the plurality of transmission beams (tx-beam #1) such that at least two of the plurality of transmission beams are associated with different demodulation reference signal sequences.

In one general first example, the techniques disclosed here feature a base station comprising processing circuitry and a transceiver. The processing circuitry (180) assumes that the mobile terminal is configured to use for downlink control channel (PDCCH) and corresponding demodulation reference signal (DM-RS) receptions at the mobile terminal one of a plurality of reception beams (tx-beam #1). The transceiver (170) transmits a downlink control channel (PDCCH) and corresponding demodulation reference signal (DM-RS) to the mobile terminal using one of a plurality of transmission beams (tx-beam #1) corresponding to the assumed one of the plurality of reception beams (tx-beam #1). The processing circuitry (180) modulates the downlink control channel (PDCCH) to be transmitted and generates a demodulation reference signal sequence to be transmitted as the corresponding demodulation reference signal (DMRS). The demodulation reference signal sequence is generated observing an association which is associating the generated sequence with the one of the plurality of transmission beams (tx-beam #1) such that at least two of the plurality of transmission beams are associated with different demodulation reference signal sequences.

In one general first example, the techniques disclosed here feature a method comprising the following steps performed by a user equipment. The mobile terminal assumes that a base station is configured to use for downlink control channel (PDCCH) and corresponding demodulation reference signal (DM-RS) transmissions to the mobile terminal one of a plurality of transmission beams (tx-beam #1). The mobile terminal receives a downlink control channel candidate (PDCCH candidate) and a corresponding demodulation reference signal (DM-RS) from the base station using one of a plurality of reception beams (rx-beam #1) corresponding to the assumed one of the plurality of transmission beams (tx-beam #1). The mobile terminal performs radio channel estimation based on the received demodulation reference signal (DM-RS) and, depending on a radio channel estimation quality, demodulates the downlink control channel candidate (PDCCH candidate) using the radio channel estimation. The channel estimation is performed using a demodulation reference signal sequence which is generated observing an association which is associating the generated sequence with the assumed one of the plurality of transmission beams (tx-beam #1) such that at least two of the plurality of transmission beams are associated with different demodulation reference signal sequences.

In one general first example, the techniques disclosed here feature a method comprising the following steps performed by a base station. The base station assumes that the mobile terminal is configured to use for downlink control channel (PDCCH) and corresponding demodulation reference signal (DM-RS) receptions at the mobile terminal one of a plurality of reception beams (tx-beam #1). The base station transmits a downlink control channel (PDCCH) and corresponding demodulation reference signal (DM-RS) to the mobile terminal using one of a plurality of transmission beams (tx-beam #1) corresponding to the assumed one of the plurality of reception beams (tx-beam #1). The base station modulates the downlink control channel (PDCCH) to be transmitted and generates a demodulation reference signal sequence to be transmitted as the corresponding demodulation reference signal (DMRS). The demodulation reference signal sequence is generated observing an association which is associating the generated sequence with the one of the plurality of transmission beams (tx-beam #1) such that at least two of the plurality of transmission beams are associated with different demodulation reference signal sequences.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 3 shows an exemplary implementation of an association between transmit beams and demodulation reference signal generating base sequences FIG. 4 details an another exemplary implementation of an association between transmit beams and demodulation reference signal generating base sequences, FIGS. 5a-5c display an exemplary mechanism for creating demodulation reference signal generating base sequences.

DETAILED DESCRIPTION

Figure 1:
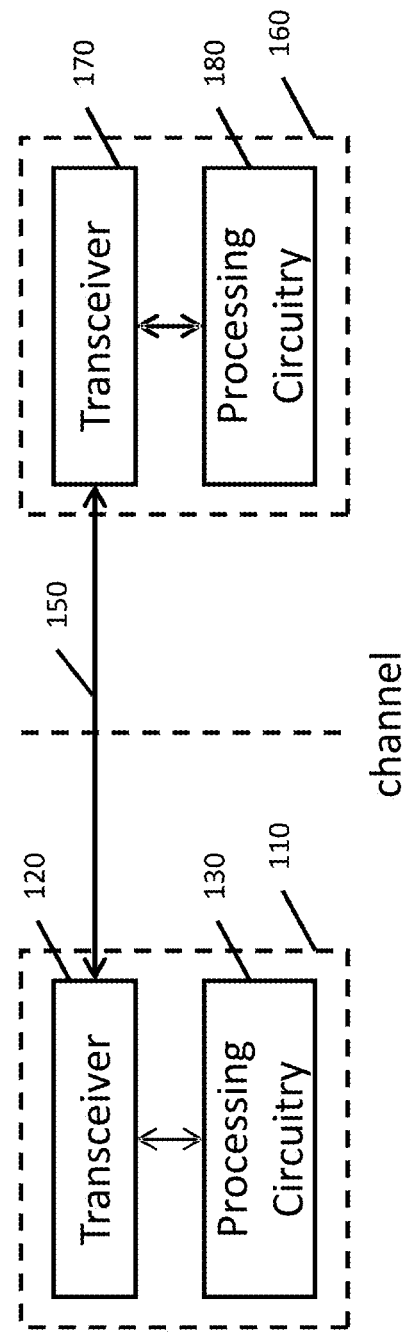
FIG. 1 illustrates the exemplary and simplified structure of a mobile terminal and a base station.

In 3GPP NR, the operation in unlicensed spectrum (termed NR-U) has greatly improved over mechanisms known from the former versions of, for example, the LTE standards. In its efforts to standardize this operation, 3GPP has devoted a study item, i.e., 3GPP RP-172021 to this topic, which in its entirety is incorporated herein by reference. For example, in section 4.1 of this document, the different architectural scenarios are discussed, including NR-based Licensed Assisted Access (LAA), and an NR-based standalone cell operation in unlicensed spectrum.

Overview

As defined in Release-15, all Release-15 NR UEs in licensed band operation will be able to support 100 MHz bandwidth for sub-6 GHz (e.g., bands in 450 MHz-6 GHz)), and 400 MHz bandwidth for millimeter wave (e.g., bands in 24.25 GHz-52.6 GHz). In addition, there are several wide unlicensed frequency bands available, which can be made use of in order to satisfy the everlasting demand for faster, more responsive mobile broadband. Hence, wideband operation in unlicensed spectrum is one of the key building blocks for NR-U.

Another key feature for fourth generation (4G) LTE and 5G New Radio (NR) is multiple-input multiple-output (MIMO) transmission. With the advent of active antenna (AA) arrays, utilizing a large number of antenna elements at base stations (BSs) has become feasible. Moreover, rectangular (2D) AA arrays can be utilized where beamforming can be performed along each available spatial dimension (e.g., azimuth and elevation).

In the most recent LTE Release (termed full-dimensional MIMO or FD-MIMO), rank-adapted spatial multiplexing with up to 32 digitally precoded antenna ports is supported. LTE FD-MIMO is designed to operate in lower frequency bands, known as the sub-6 GHz regime. On the other hand, as the availability of sub-6 GHz spectrum becomes more limited, millimeter-wave (mmWave) frequency bands (also termed the over-6 GHz regime) with wider bandwidths will be made available for cellular communications in 5G. Although promising, its characteristics differ from sub-6 GHz. For instance, with higher propagation loss, beamforming with larger number of antenna elements becomes crucial for ensuring sufficient coverage. However, utilizing a large number of digitally precoded ports is infeasible in the current device technology. This necessitates so-called hybrid beamforming wherein analog beams are used with a small number of digitally precoded ports. Here, user equipment (UE) needs to acquire a set of analog beams in conjunction with MIMO-related digital operations.

As analog antenna processing will be carried out on a carrier basis, this also implies that beam-formed transmission can only be done on one direction at a time. Downlink transmissions to different devices located in different directions relative to the base station must therefore be separated in time. Likewise, in the case of analog-based receiver-side beam-forming, the receive beam can only focus in one direction at time.

Therefore, beam management is required in the 5G NR design. The ultimate task of beam management is, under these conditions, to establish and retain a suitable beam pair, that is, a transmitter-side beam direction and a corresponding receiver-side beam direction that jointly provide good connectivity.

Operation in Unlicensed Spectrum

As already considered in 3GPP RP-141646, some regions in the world require unlicensed technologies to abide to certain regulations, e.g., Listen-Before-Talk (LBT). Fair coexistence between cellular operations and other technologies such as Wi-Fi, in its different versions, as well as between cellular operators themselves, is necessary.

Even in countries without LBT, regulatory requirements exist to attempt to minimize interference with other users of the unlicensed spectrum. However, it is not enough to minimize interference simply for regulatory aspects. It is thus, essential to ensure that a NR-based unlicensed access wideband system operates as a "good neighbor" towards all forms of legacy systems.

The Listen-Before-Talk (LBT) procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations, for instance, mandate the usage of LBT in the unlicensed bands. Apart from regulatory requirements, this carrier sensing via LBT is one way for fair sharing of the unlicensed spectrum, and hence it is considered to be a vital feature for fair and friendly operation in the unlicensed spectrum in a single global solution framework.

Following this European regulation regarding LBT, devices have to perform a Clear Channel Assessment (CCA) before occupying the radio channel with a data transmission. It is only allowed to initiate a transmission on the unlicensed channel after detecting the channel as free based e.g., on energy detection. In particular, the equipment has to observe the channel for a certain minimum time (e.g., for Europe 20 μs, see ETSI 301 893, under clause 4.8.3) during the CCA.

The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is determined as being occupied, it shall not transmit on that channel during the next Fixed Frame Period. If the channel is classified as free, the device is allowed to transmit immediately. The maximum transmit duration is restricted in order to facilitate fair resource sharing with other devices operating on the same band.

In particular, maximum transmit duration during which an equipment is transmitting on a given carrier without re-evaluating the availability of that carrier (i.e., LBT/CCA) is defined as the channel occupancy time (see e.g., ETSI 301 893, clause 4.8.3.1). The channel occupancy time shall be in the range of 1 ms to 10 ms, where the maximum channel occupancy time could be e.g., 4 ms as currently defined for Europe.

Present Disclosure

Considering the above, the present disclosure has been conceived by the inventors with the understanding that downlink control channel receptions require a mobile terminal to perform a non-negligible number of blind decoding attempts on different downlink control channel candidates. This blind decoding mechanism results in a non-negligible processing load at the mobile terminal.

Especially when operating in unlicensed spectrum, a mobile terminal may perform downlink control channel receptions irrespective of whether the channel has actually been acquired for cellular operation. In other words, the mobile terminal will monitor the downlink control channel irrespective of whether the base station has successfully completed the Listen-Before-Talk procedure or has failed therewith.

Independent of the timing constraints imposed by Listen-Before-Talk, the processing load which is resulting from blind decoding attempts of the downlink control channel are equally high during unlicensed and licensed operation.

It is important to understand that the presently available mechanism for downlink control channel receptions cannot ensure that the processing load is in a fair relationship to successful receptions of downlink control information carried thereon. Rather, the timing constraints imposed by Listen-Before-Talk have further worsened this relationship.

The monitoring requirement originates from the specification of search space sets in NR (see technical specification 3GPP TS 38.213 version V15.2.0, published 2018-06 on the website 3gpp.org, and titled, "NR; Physical layer procedures for control (Release 15)," which in its entirety is incorporated herein by reference; particularly section 10 titled "UE procedures for receiving control information" and section 11.1 UE procedure for determining "slot format" thereof).

A UE, for example, monitors a set of PDCCH candidates in one or more control resource sets (CORESETs) on the active DL bandwidth-part (BWP) on each activated serving cell configured with PDCCH monitoring according to corresponding search space sets where monitoring implies decoding each PDCCH candidate according to the monitored DCI formats.

The control resource set is e.g., defined as follows (see section 10.1 titled, "UE procedure for determining physical downlink control channel assignment" of 3GPP TS 38.213 referenced above): For each DL BWP configured to a UE in a serving cell, a UE can be provided by higher layer signaling with control resource sets (CORESETs). For each control resource set (CORESET), the UE is provided the following by higher layer parameter ControlResourceSet:

- a control resource set index p, $0 \leq p < 12$, by higher layer parameter controlResourceSetId;
- a DM-RS scrambling sequence initialization value by higher layer parameter pdcch-DMRS-ScramblingID;
- a precoder granularity for a number of REGs in the frequency domain where the UE can assume use of a same DM-RS precoder by higher layer parameter precoderGranularity;
- a number of consecutive symbols provided by higher layer parameter duration;
- a set of resource blocks provided by higher layer parameter frequencyDomainResources;
- CCE-to-REG mapping parameters provided by higher layer parameter cce-REG-MappingType;
- an antenna port quasi co-location, from a set of antenna port quasi co-locations provided by higher layer parameter TCI-StatesPDCCH, indicating quasi co-location information of the DM-RS antenna port for PDCCH reception;
- an indication for a presence or absence of a transmission configuration indication (TCI) field for DCI format 1_1 transmitted by a PDCCH in control resource set p, by higher layer parameter TCI-PresentInDCI.

For sake of completeness, reference is made to technical specification 3GPP TS 38.331 in version V15.2.1 published 2018-06 on the website 3gpp.org, and titled, "NR; Radio Resource Control (RRC) protocol specification (Release 15)," which in its entirety is incorporated herein by reference. Particular reference is made to section 6.3.2 titled, "Radio resource control information element," thereof, which defines the control Resource Set (CORESET) information element, termed "ControlResourceSet IE."

Additionally, the monitoring of PDCCH candidates is defined to be according to corresponding search space sets. A search space set can be a common search space set or a UE-specific search space set. A UE monitors PDCCH candidates in one or more of the following search spaces sets

- a Type0-PDCCH common search space set configured by searchSpaceZero in MasterInformationBlock or by searchSpaceSIB1 in PDCCH-ConfigCommon for a DCI format with CRC scrambled by a SI-RNTI on a primary cell;
- a Type0A-PDCCH common search space set configured by searchSpace-OSI in PDCCH-ConfigCommon for a DCI format with CRC scrambled by a SI-RNTI on a primary cell;

a Type1-PDCCH common search space set configured by ra-SearchSpace in PDCCH-ConfigCommon for a DCI format with CRC scrambled by a RA-RNTI, or a TC-RNTI on a primary cell;

a Type2-PDCCH common search space set configured by pagingSearchSpace in PDCCH-ConfigCommon for a DCI format with CRC scrambled by a P-RNTI on a primary cell;

a Type3-PDCCH common search space set configured by SearchSpace in PDCCH-Config with searchSpaceType=common for DCI formats with CRC scrambled by INT-RNTI, or SFI-RNTI, or TPC-PUSCH-RNTI, or TPC-PUCCH-RNTI, or TPC-SRS-RNTI and, only for the primary cell, C-RNTI, or CS-RNTI(s); and a UE-specific search space set configured by SearchSpace in PDCCH-Config with searchSpaceType=ue-Specific for DCI formats with CRC scrambled by C-RNTI, or CS-RNTI(s).

The following mechanism for configuring search space sets in the UE can be used (see e.g., section 10.1 titled, "UE procedure for determining physical downlink control channel assignment" of 3GPP TS 38.213 referenced above).

For each DL BWP configured to a UE in a serving cell, the UE is provided by higher layers with S≤10 search space sets where, for each search space set from the S search space sets, the UE is provided the following by higher layer parameter SearchSpace:

a search space set index s, 0≤s<40, by higher layer parameter searchSpaceId;

an association between the search space set s and a control resource set p by higher layer parameter controlResourceSetId;

a PDCCH monitoring periodicity of $k_{p,s}$ slots and a PDCCH monitoring offset of $o_{p,s}$ slots, by higher layer parameter monitoringSlotPeriodicityAndOffset;

a PDCCH monitoring pattern within a slot, indicating first symbol(s) of the control resource set within a slot for PDCCH monitoring, by higher layer parameter monitoringSymbolsWithinSlot;

a number of PDCCH candidates $M_{p,s}^{(L)}$ per CCE aggregation level L by higher layer parameters aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively;

an indication that search space set S is either a common search space set or a UE-specific search space set by higher layer parameter searchSpaceType;

if search space set S is a common search space set,
  an indication by higher layer parameter dci-Format0-0-AndFormat1-0 to monitor PDCCH candidates for DCI format 0_0 and DCI format 1_0 with CRC scrambled by a C-RNTI or a CS-RNTI (if configured), RA-RNTI, TC-RNTI, P-RNTI, SI-RNTI;
  an indication by higher layer parameter dci-Format2-0 to monitor one or two PDCCH candidates for DCI format 2_0 and a corresponding CCE aggregation level;
  an indication by higher layer parameter dci-Format2-1 to monitor PDCCH candidates for DCI format 2_1;
  an indication by higher layer parameter dci-Format2-2 to monitor PDCCH candidates for DCI format 2_2;
  an indication by higher layer parameter dci-Format2-3 to monitor PDCCH candidates for DCI format 2_3;

if search space set is a UE-specific search space set, an indication by higher layer parameter dci-Formats to monitor PDCCH candidate either for DCI format 0_0 and DCI format 1_0, or for DCI format 0_1 and DCI format 1_1.

For sake of completeness, reference is made to technical specification 3GPP TS 38.331 (referenced above) in section 6.3.2 titled, "Radio resource control information element" specifies, thereof, which defines the Search Space information element, termed "SearchSpace IE."

Benefits of the Present Disclosure

In the context of the present disclosure, the inventors have recognized that it is beneficial for mobile terminals to know whether or not it is intended, at a specific time instant, to monitor a set of PDCCH candidates in one or more control resource sets (CORESETs). This knowledge may help the mobile terminal to decide, at this time instant, whether or not it can skip monitoring control resource sets (CORESETs).

For conveying this knowledge to mobile terminals, the present disclosure makes readily use of the fact that the PDCCH is signaled in a beam-forming manner. In this regard, not only the PDCCH but also the demodulation reference signals (DMRS) are transmitted using beam-forming mechanisms. However, the presently used beam-forming is transparent to the mobile terminals, and hence does not permit such benefits.

To circumvent this, one general concept of the present disclosure is to provide an association between demodulation reference signal sequences and transmission beams such that each mobile terminal can restrict its processing to demodulation reference signals which are specific to their transmission beams only.

Should a mobile terminal find out that the processing with only those demodulation reference signals that are specific to their transmission beam is unsuccessful, then it can skip any further monitoring of the PDCCH candidates in the one or more control resource sets (CORESETs). This facilitates the mobile terminal to substantially reduce its processing load, especially (but not exclusively) when operating in an unlicensed spectrum.

Generic Scenario

In the following, mobile terminals, base stations, and procedures to meet these needs will be described in relation to the new radio access technology envisioned for the 5G mobile communication systems, but which may also be used in LTE mobile communication system. Different implementations and variants will be explained as well. The following disclosure has been facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers etc., used in the following are closely related to LTE/LTE-A systems or to terminology used in the current 3GPP 5G standardization, even though specific terminology to be used in the context of the new radio access technology for the next 3GPP 5G communication systems is not fully decided yet.

Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

FIG. 1 illustrates a block diagram of a wireless communication system including a mobile terminal 110 (also referred to as user equipment, UE), and a base station 160 (also referred to as g Node B, gNB). The mobile terminal 110 comprises processing circuitry 130 and a transceiver 120 which are indicated as separate building blocks in the diagram. Similarly, the base station 160 comprises processing circuitry 180 and a transceiver 170 which are indicated as separate building blocks in the diagram.

Figure 2:
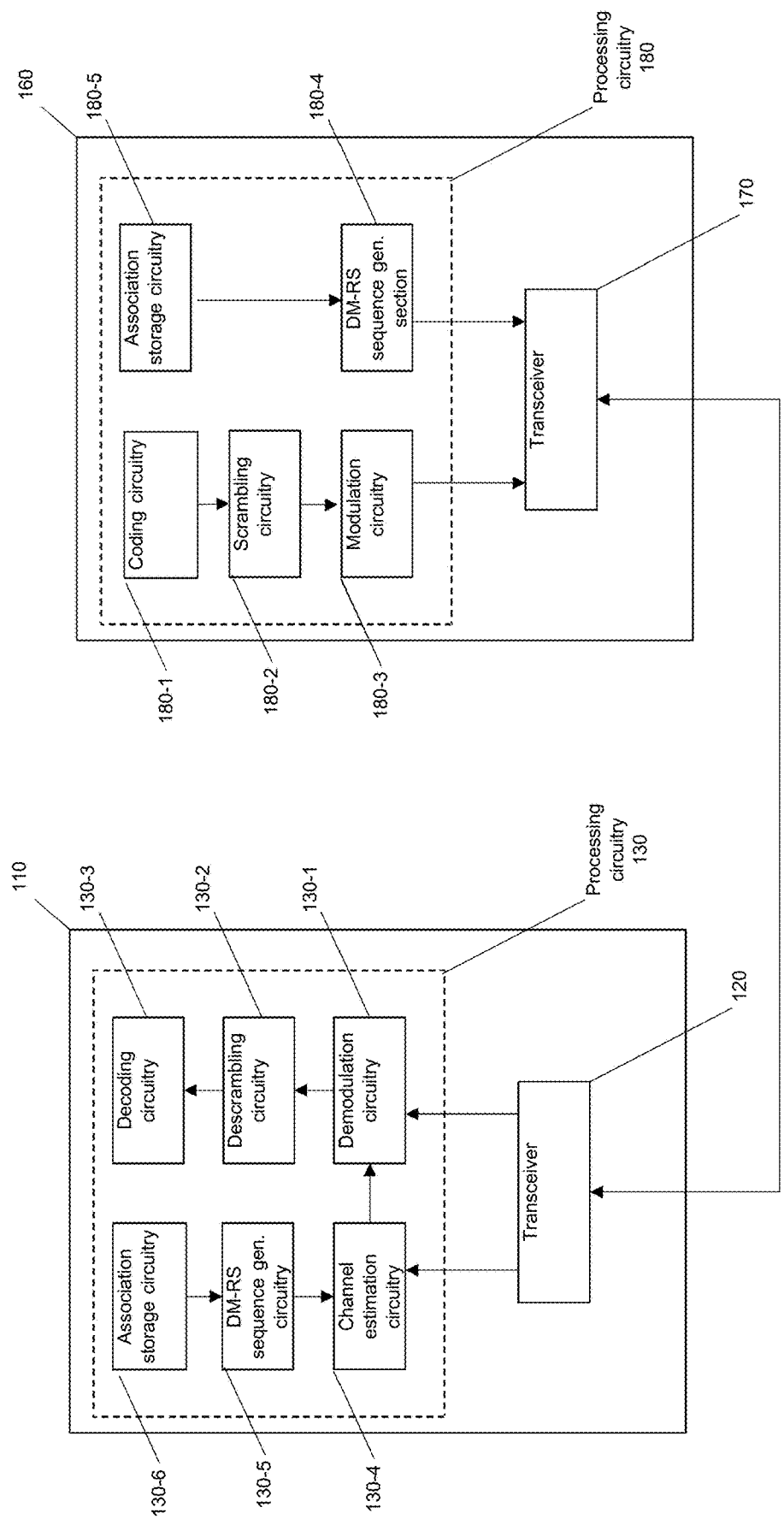
FIG. 2 depicts a structure of the mobile terminal and the base station according to an exemplary implementation.

FIG. 2 is an exploded view of the separate building blocks of FIG. 1, and depicts implementation specific circuitry of the mobile terminal 110 and of the base station 160 included in the wireless communication system.

For ease of understanding, this figure has been simplified to only show circuitry which is related to downlink control channel receptions. This shall, however, not be understood as imposing any limitations upon the functionality of the mobile terminal 110 and the base station 160 of the wireless communication system.

In more detail, the mobile terminal 110 in FIG. 2 comprises again the transceiver 120 and processing circuitry 130. Importantly, the processing circuitry 130 comprises a demodulation circuitry 130-1, descrambling circuitry 130-2, and a decoding circuitry 130-3, and additionally comprises a radio channel estimation circuitry 130-4, a demodulation reference signal (also referred to as DM-RS) generation circuitry 130-5 and an association storage circuitry 130-6.

Further, the base station 160 in FIG. 2 comprises again the transceiver 170 and the processing circuitry 180. Importantly, the processing circuitry 180 comprises a coding circuitry 180-1, a scrambling circuitry 180-2, a modulation circuitry 180-3, and also an association storage circuitry 180-5, and a demodulation reference signal (DM-RS) sequence generation section 180-4.

In general the following description assumes that the mobile terminal 110 and the base station 160 engage in downlink communication with each other via beams. For downlink transmissions, the base station 160 is configured with a plurality of transmission beams (tx-beam #1, tx-beam #2, tx-beam #3, . . . ), which have different directivities and/or coverage. Equally, the mobile terminal 110 is configured with a plurality of reception beams (rx-beam #1, rx-beam #2, rx-beam #3, . . . ) which also have different directivities and/or coverage.

Well established procedures for beam management serve the purpose of establishing an initial beam pair, serve the purpose of adjusting the beam pair during normal operation, and serve the purpose of recovering the beam pair after beam failure. Importantly, the beam pair identifies a pair comprising one transmission beam (e.g., tx-beam #1) of the base station 160 and a reception beam (e.g., rx-beam #1) of the mobile terminal 110 for the downlink communication.

Such a beam pair may identify a pair of transmission and reception beams which have opposite directivity and/or coverage, i.e., beams which are physically pointing directly at each other. However, this does not always result in good connectivity. Due to obstacles in the surrounding environment, such a direct path between transmitter and receiver may be blocked, and a reflected path may provide better connectivity.

In the context of the present disclosure, it is important to understand that the mobile terminal 110 is aware of such a beam pair or correspondence between transmission beam (e.g., tx-beam #1) and reception beam (e.g., rx-beam #1) which has proven suitable for carrying downlink communication. In other words, this correspondence may entail a direct path or a reflected path of radio wave propagation.

Now, when referring to downlink control channel (also referred to as physical downlink control channel, PDCCH) receptions, one aspect in the present disclosure is that the mobile terminal, in particular its processing circuitry 130, has an assumption on (exactly) which one of its plural transmission beams will be used by the base station for downlink transmissions.

The processing circuitry 130 may infer this assumption from (successful) downlink transmissions in the past. Notably, there is no necessity to restrict the present disclosure only to ongoing downlink transmissions. Rather, the processing circuitry 130 can also infer the assumption in case of an initial beam establishment and/or in case of a beam failure recovery.

In any case, the mobile terminal 110 signals to the base station 160 the transmission beam which permits the transceiver 120 to detect a highest reception power and/or reception quality. Also in this case, the processing circuitry 130 can reasonably assume that the base station relies on this signaled transmission beam for subsequent downlink communication.

In short, there exist numerous scenarios where the processing circuitry 130 of the mobile terminal 110 has an assumption regarding which one of the plurality of transmission beams (e.g., tx-beam #1) the base station 160 is configured to use for downlink control channel (also referred to as physical downlink control channel, PDCCH) and corresponding demodulation reference signal (DM-RS) transmissions.

With this assumption, the transceiver 120 of the mobile terminal 110 performs receptions, namely by using one of its plurality of reception beams (e.g., rx-beam #1) which is corresponding to the assumed one of the plural transmission beams of the base station 160. As discussed above, this correspondence entails a pair of beams which are physically corresponding to each other, or which are (already) found to resemble the best correspondence.

Having received the demodulation reference signal, the processing circuitry 130 of the mobile terminal 110, performs radio channel estimation based thereon. This may be performed e.g., in the radio channel estimation circuitry 130-4.

By way of example, 5G NR is carrying demodulation reference signals specifically associated with a downlink control channel to permit coherent demodulation of the corresponding control channel candidates. For this purpose, the received demodulation reference signal, to be used for channel estimation, corresponds to the received downlink control channel candidate to be demodulated as discussed below.

This correspondence between demodulation reference signal and downlink control channel candidate may result from a neighboring location in time and frequency where both are transmitted.

By way of example, 5G NR prescribes such neighboring location in that it maps the demodulation reference signals onto every fourth subcarrier in a resource element group, REG. A set of plural REGs is defined as a REG bundle across which precoding is constant. Thus, channel estimation is performed per REG bundle, at least one of which forms the control resource set (CORESET).

Further, the mapping of the physical downlink control channel PDCCH carrying coded and modulated downlink control information DCI is subject to a certain structure, based on control channel elements, CCEs, and same resource element groups, REGs. A PDCCH is transmitted using 1, 2, 4, 8, or 16 contiguous control channel elements which are defined as aggregation levels. The control channel element is the unit in terms of which the search spaces are defined.

In particular, a search space is a set of downlink control channel candidates formed by CCEs at a given aggregation level, which the mobile terminal attempts to decode. At a configured monitoring occasion for a search space, the mobile terminal will attempt to decode the downlink control channel candidates, the number of which is configured per search space (and thus also per aggregation level).

The radio channel estimation is performed by the processing circuitry 130 using a demodulation reference signal sequence which is (separately) generated at the mobile terminal. In particular, the processing circuitry 130 may use a sequence which is generated in the DM-RS sequence generation circuitry 130-5.

By way of example, in 5G NR the demodulation reference signals for the downlink control channel are generated using a higher layer parameter pdcch-DMRS-SramblingID, if provided, or by the physical layer cell identity (see e.g., TS38.211, section 7.4.1.3.1). These parameters are used to initialize a pseudo-random sequence generator, where the generated pseudo-random sequence c(i) defines the reference-signal sequence $r_l(m)$ for OFDM symbol 1.

The processing circuitry 130 generates the demodulation reference signal sequence observing (complying with, taking into account) an association which associates it with the assumed one of the plurality of transmission beams. In other words, this association directly influences which demodulation reference signals sequence is generated.

In an exemplary configuration, this association can be provided to mobile terminals via higher layer signaling, e.g., via radio resource control, RRC, configuration, or system information signaling, or may be inferred at each mobile terminal separately, e.g., derived from the synchronization signal block (SSB) index each of which identifies a separate one of the plurality of transmission beams of the base station.

Considering for example a specific assumed transmission beam, the association may directly associate this assumed transmission beam with the generated demodulation reference signal sequence. Also, the association may associate the assumed transmission beam with a sequence (also termed base sequence) on the basis of which the demodulation reference signal sequence is generated. Then, the association may indirectly associate this assumed transmission beam with the generated demodulation reference signal sequence.

The association may be stored in an association storage circuitry 130-6 and is shown, for example, in FIG. 3, where each of the plurality of transmission beams is associated with a different demodulation reference signal (DM-RS) generating base sequence, and thus indirectly associated with the generated demodulation reference signal sequence.

For compatibility reasons, the exemplarily shown DM-RS generating base sequence is defined to include 16 bits, thereby reusing the format of the parameter specified in 5G NR that initializes the pseudo-random sequence generator. This shall however not be understood as limiting the present disclosure.

In any case, the association is defined to ensure that at least two of the plurality of transmission beams are associated with different demodulation reference signal sequences. In other words, there exist two transmission beams, for which the processing circuit 130—when observing the association—will generate two different demodulation reference signal sequences.

Consequently, the association prescribes that the processing circuit 130 will generate different demodulation reference signal sequences depending on which one of the plural transmission beams it considers as the assumed transmission beam. Observing such an association, the processing circuitry 130 performs an improved channel estimation.

The processing circuitry 130 performs a channel estimation which considers a demodulation reference signal which is specific to the transmission using the assumed transmission beam. This assumed transmission beam is the beam which has proven good connectivity for the mobile terminal 110.

Other mobile terminals will likely consider other assumed transmission beams. Accordingly, these other mobile terminals will receive demodulation reference signals which are specific to transmissions using their assumed transmission beams, and which have proven good connectivity for them.

The channel estimation performed by the processing circuitry 130 can, when observing the association, already at a very early stage of the downlink control channel reception permit the mobile terminal 110 to know whether or not the received demodulation reference signal is actually intended for itself or not. This permits the mobile terminal to possibly skip any further processing of downlink control channel candidates associated with this demodulation reference signal.

In more detail, assuming for example that the demodulation reference signal was not intended for the mobile terminal 110, the channel estimation performed by the processing circuitry would be based on a demodulation reference signal that was generated by the base station 160 in association with a different transmission beam than the demodulation reference signal sequence generated by the mobile terminal 110.

In an exemplary implementation, the processing circuitry 130 (cross-)correlates the received demodulation reference signal (DM-RS) with the generated demodulation reference signal sequence, and the processing circuitry 130 then determines a radio channel estimation quality based on the correlation result, and in case the radio channel estimation quality is below a threshold, the processing circuitry 130 does not demodulate the received downlink control channel candidate.

As the association prescribes that at least two of the plurality of transmission beams are associated with different demodulation reference signal sequences, this may result in a channel estimation which is accordingly using a different demodulation reference signal sequence as compared to that which was used by the base station 160 to perform the demodulation reference signal transmission. And such a difference between the sequences will result in the processing circuitry estimating a poor (inferior, bad) quality of the radio channel.

In other words, the channel estimation quality is a sufficient indicator on which the further processing of the corresponding downlink control channel candidates may depend. For example, by simply discarding poor radio channel quality estimations, the mobile terminal can possibly skip any further processing of downlink control channel candidates corresponding to this demodulation reference signal. Thereby, also the processing load for the mobile terminal is reduced.

When the mobile terminal 110 performs channel estimation based on a received demodulation reference signal which was actually intended for the mobile terminal, the processing circuitry 130 determines a sufficient (superior, good) radio channel estimation quality (unless the channel is otherwise disturbed).

Using this radio channel quality, the processing circuitry 130 of this mobile terminal 110 then demodulates the received downlink control channel candidate, which is corresponding to the received demodulation reference signal. For this demodulation, the processing circuitry 130 uses the radio channel estimation. The demodulation may be performed in the demodulation circuitry 130-1.

Again, the processing circuitry 130 performs the demodulation not independent of the outcome of the channel estimation. Rather, the demodulation is being performed by the processing circuitry 130 depending on the channel estimation quality. Hence, it can be ensured that demodulation reference signal transmissions which are not intended for the mobile terminal are not used by the processing circuitry 130 during modulation.

Only for the sake of completeness, it shall be mentioned that the mobile terminal 110 may also include a descrambling circuitry 130-2, and a decoding circuitry 130-3 which performs the blind decoding of the respective search spaces. These circuitries are being sequentially operated should the demodulation using the radio channel estimation be successful.

Similarly to the above, the base station 160 is also operating based on an association.

Here the processing circuitry 180 of the base station 160 assumes that the mobile terminal is configured to use for downlink control channel (abbrev. as PDCCH) and corresponding demodulation reference signal (DM-RS) receptions at the mobile terminal one of a plurality of reception beams (rx-beam #1).

The transceiver 170 of the base station 160 transmits a downlink control channel and corresponding demodulation reference signal to the mobile terminal using one of a plurality of transmission beams (tx-beam #1) corresponding to the assumed one of the plurality of reception beams (rx-beam #1).

The processing circuitry (160), in operation, modulates the downlink control channel (PDCCH) to be transmitted and generates a demodulation reference signal sequence to be transmitted as the corresponding demodulation reference signal (DMRS).

The demodulation reference signal sequence is generated observing an association which is associating the generated sequence with the one of the plurality of transmission beams (tx-beam #1) such that at least two of the plurality of transmission beams are associated with different demodulation reference signal sequences.

First Exemplary Association

In connection with the above, an association is described which prescribes that at least two of the plurality of transmission beams are associated with different demodulation reference signal sequences. There are numerous mechanisms to define such an association. Further, it has been discussed that the association may directly or indirectly associate the transmission beams with the generated demodulation reference signal sequence.

In the following, a first exemplary association is described which indirectly associates the transmission beams with different demodulation reference signal sequences. An implementation of such an exemplary association is depicted in FIG. 4. In particular, the association is defined with regard to DM-RS generating base sequences (or modified scrambling-ID) which in turn are to be used for generating the demodulation reference signal sequences.

In other words, in this example, the processing circuitry 130 generates the demodulation reference signal sequence from a base sequence which includes: an identification of the assumed one of the plurality of transmission beams (tx-beam ID), such that the generated demodulation reference signal sequence is associated with the assumed one of the plurality of transmission beams (tx-beam #1).

With such a definition of the association, it can be ensured that at least two of the plurality of transmission beams are associated with different demodulation reference signal sequences.

For example, a base sequence (or modified scrambling-ID) additionally includes at least one of: at least a part of an identification of the cell (Cell-ID) comprising the assumed transmission beam, and at least a part of an identification of the network (PLMN-ID) comprising the cell. The at least parts of the identification of the cell or of the network may correspond to a predetermined number of least significant bits of the respective identification.

Note that the Cell-ID, PLMN-ID or beam ID can also impact the base sequence in an indirect way, e.g., base sequence (or modified scrambling-ID) can also be derived based on a first number generated from PLMN-ID, a second number generated from Cell ID and a third number generated from beam ID, where at least one of the numbers is shorter than the original length of Cell ID, PLMN ID or beam ID.

With this addition of at least parts of the Cell-ID and PLMN-ID to the DM-RS generating base sequence, conflicts resulting from the same associations between neighboring cells and/or networks can be prevented.

In other words, generating the association deterministically (e.g., not randomly) always bears the risk that for two base stations in neighboring cells and neighboring networks, the same demodulation reference signal sequence is generated for a same transmission beam. With these additions, conflicts can be prevented.

Taking for example, the first row in FIG. 4, the association specifies that the transmission beam #0 is associated with a base sequence which includes, as beam identification the value '011 001.' Further, the base sequence includes, as part of the cell identification the value '10101.' Finally, the base sequence also includes, as part of the network identification, the value '00101.'

Figure 5A:
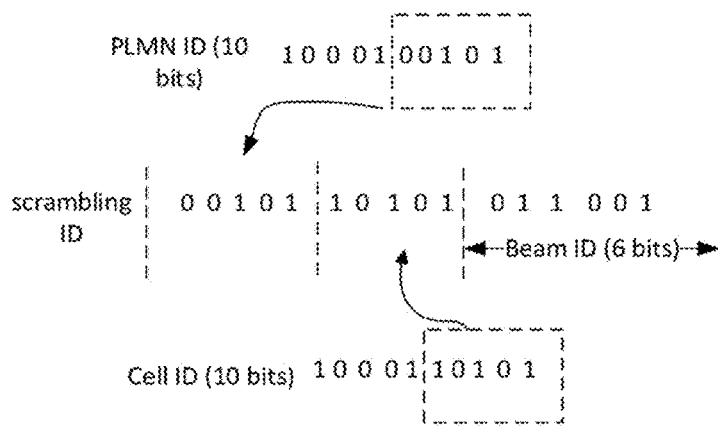
Figure 5B:
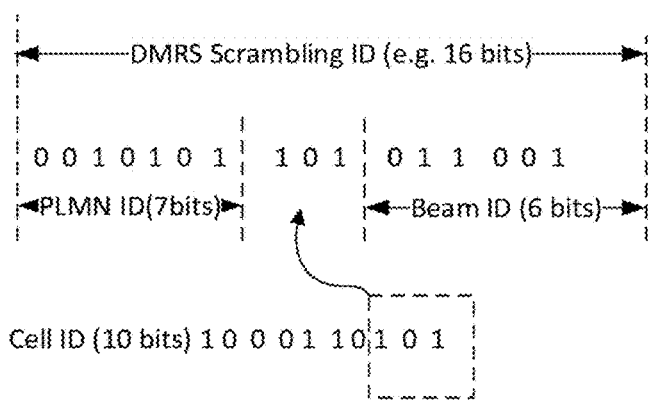
Figure 5C:
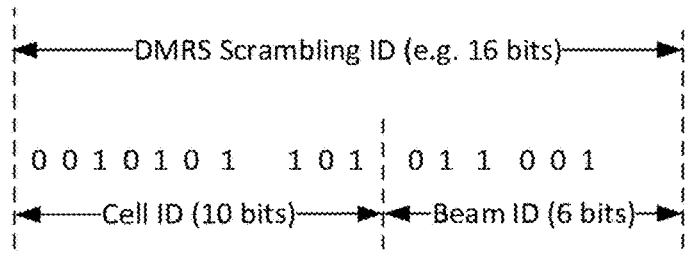

In 5G NR, the PLMN ID is defined to require minimum 7 bits and maximum 20 bits, and the Cell ID is defined to require 10 bits. In order to arrive at a total of 16 bits, the identification values are truncated such that each comprises 5 bits. This is shown in FIG. 5a. Alternative compositions of the base sequence are shown in FIG. 5b, where only the Cell ID is truncated to 3 bits, and the minimum of 7 bits of the PLMN ID is reused, and in FIG. 5c, where the PLMN ID is (completely) discarded, and the Cell ID is reused with its total length of 10 bits. The latter case shown in FIG. 5c is suitable, for example, for licensed band operation with only one operator (and hence only one PLMN ID) in the given area. On the other hand, the case in FIG. 5b is suitable for the scenario where only a few cells are deployed in the given area. The case in FIG. 5a provides the trade-off between the number of distinguishable cells and number of distinguishable networks. Alternatively, in case where the PLMN ID is not available, the fixed value, e.g., 0, can be used in the corresponding bit field of the base sequence.

This exemplary implementation can be combined with a scrambling/descrambling of the downlink control channel.

According to a further exemplary implementation, the processing circuitry 130 de-scrambles the demodulated downlink control channel candidate using the base sequence in the mobile terminal. Similarly, the processing circuit 180 scrambles the downlink control channel to be modulated using the base sequence in the base station. This further enhances the separation.

Second Exemplary Association

A second exemplary association is disclosed which indirectly associates the transmission beams with different demodulation reference signal sequences.

This implementation builds on the general understanding that first the demodulation reference signal sequence is derived in the conventional fashion (e.g., higher layer parameter pdcch-DMRS-SramblingID, if provided, or physical layer cell identity). Then, the sequence is subjected to orthogonal cover codes which are associated with the different transmission beams.

In other words, the processing circuitry 130 generates the demodulation reference signal sequence from a base sequence corresponding to a scrambling identification, scrambling-ID, including using an orthogonal cover code which is associated with the assumed one of the plurality of transmission beams (tx-beam #1).

With such a definition of the association, it can be ensured that at least two of the plurality of transmission beams are associated with different demodulation reference signal sequences. Additionally, this enhances the separation of different beams.

This exemplary implementation can be combined with a scrambling/descrambling of the downlink control channel.

According to a further exemplary implementation, the processing circuitry 130 de-scrambles the demodulated downlink control channel candidate using the base sequence in the mobile terminal. Similarly, the processing circuit 180 scrambles the downlink control channel to be modulated using the base sequence in the base station. This further enhances the separation.

Third Exemplary Association

A third exemplary association is disclosed which indirectly associates the transmission beams with different demodulation reference signal sequences.

This implementation builds on the general understanding that first the demodulation reference signal sequence is derived in the conventional fashion (e.g., higher layer parameter pdcch-DMRS-SramblingID, if provided, or physical layer cell identity). Then, the sequence is cyclically shifted based on different shift values which are associated with the different transmission beams.

In other words, the processing circuitry 130 generates the demodulation reference signal sequence from a base sequence corresponding to a scrambling identification, scrambling-ID, including applying a cyclic shift to the demodulation reference signal sequence corresponding to a cyclic shift value which is associated with the assumed one of the plurality of transmission beams (tx-beam #1).

Again, this exemplary implementation can be combined with a scrambling/descrambling of the downlink control channel.

According to a further exemplary implementation, the processing circuitry 130 de-scrambles the demodulated downlink control channel candidate using the base sequence in the mobile terminal. Similarly, the processing circuit 180 scrambles the downlink control channel to be modulated using the base sequence in the base station. This further enhances the separation.

First Exemplary Embodiment

Figure 6:
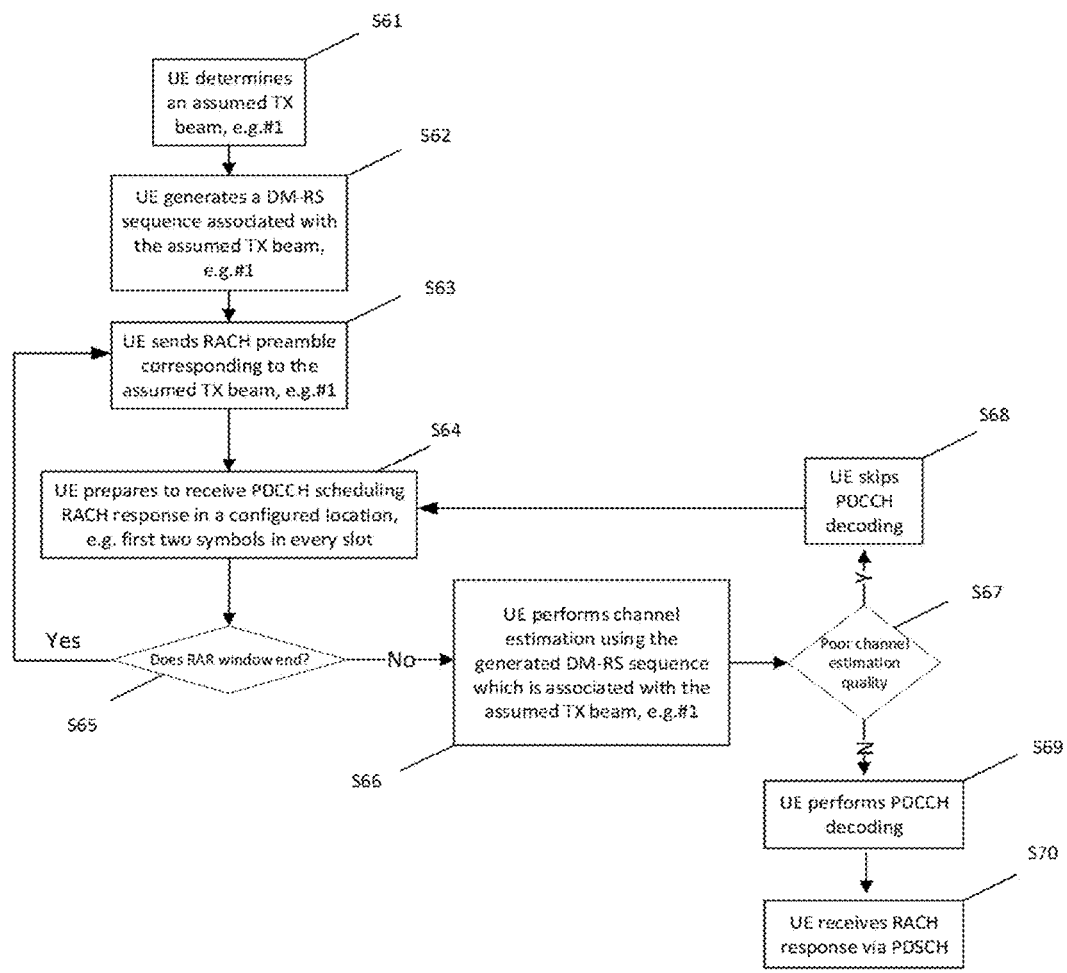
FIGS. 6 and 7 illustrate a flow diagram and a timing diagram of downlink control channel receptions according to a first exemplary embodiment.
Figure 7:
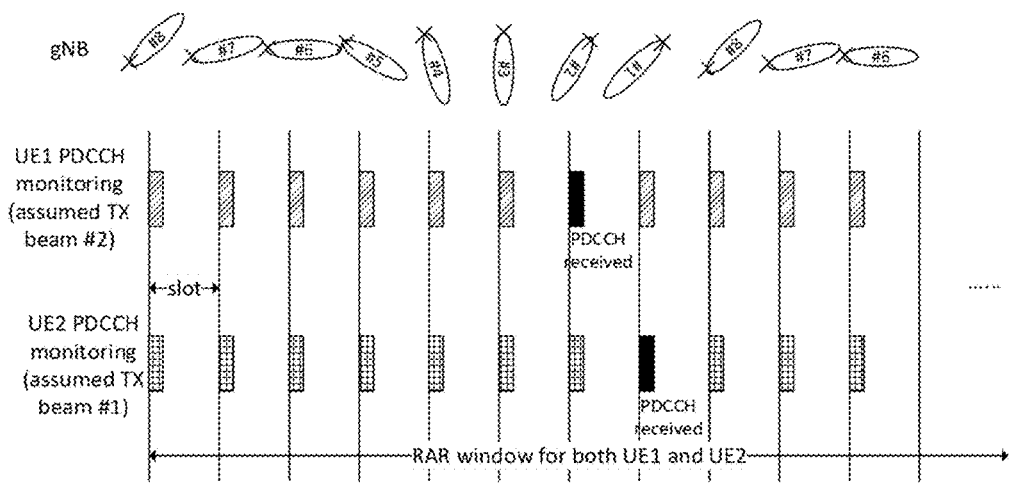

FIG. 6 illustrate a flow diagram of downlink control channel (PDCCH) receptions according to a first exemplary embodiment, whereas FIG. 7 shows a time diagram of such downlink control channel receptions.

This first exemplary embodiment exploits the general concept for receiving downlink control channel transmissions scheduling a random access response message on a downlink shared channel as shown in FIG. 7.

As this embodiment is closely linked to the random access procedure as specified in 5G NR, the according terminology is used in the following. This, however, shall not be understood as limiting the present disclosure in any respect.

The embodiment, for example, builds on the understanding that the UE (or mobile terminal) is carrying out a random access procedure, and in this context expects to receive a demodulated PDCCH candidate which is included in a common search space carrying downlink control information (DCI). Due to the association discussed before, the downlink control information (DCI) is intended for (only) a group of plural mobile terminals, and the downlink control information (DCI) corresponds to at least DCI-Format 1-0 with a CRC scrambled with a random access radio network temporary identifier (RA-RNTI).

In more detail, the UE determines (S61—FIG. 6) an assumed transmission beam, e.g., beam #1 which is suitable for communication with the gNB. For example, the UE can measure the reception power or reception quality of a Primary Synchronization Signal PSS or a Secondary Synchronization Signal SSS included in the SS block (SSB). Since the SSB is transmitted by the gNB in a beam sweeping manner, it can derive the SSB identification, and therewith, the beam ID which has proven suitable. This beam ID is henceforth considered to be the assumed transmission beam.

On this basis, the UE can already proceed to generate a DM-RS sequence associated with the assumed transmission beam, e.g., beam #1. For this generation, the UE observes (complies with, takes into account) the association, which associates the generated sequence with the assumed transmission beam, e.g., beam #1. With this association at least two of the plurality of transmission beams are associated with different DM-RS sequences. Alternatively, the UE can generate the sequence also at a later stage.

Then, the UE sends (S63—FIG. 6) a random access channel (RACH) preamble corresponding to the assumed transmission beam e.g., beam #1. In more detail, different RACH preambles and/or RACH resources are defined in 5G NR to convey the information of the best suitable (or assumed) transmission beam to the gNB. Thereby, the UE ensures that the gNB can also determine the transmission beam for subsequent transmissions to the UE.

Subsequently, the UE prepares (S64—FIG. 6) for receiving a random access response RAR message. The random access response message is transmitted by the gNB on the PDSCH and is scheduled by means of a PDCCH transmission on a corresponding common search space, e.g., Type1-PDCCH common search space set. This common search space set corresponds to a configured location in time and frequency, e.g., the first two symbols in every slot.

For the duration of the RAR window, the UE monitors (S65—FIG. 6) PDCCH transmissions for the RAR message corresponding to the RACH preamble. However, unlike the ordinary procedure, the UE carries out the improved PDCCH receptions discussed above, thereby reducing the processing load of the UE.

In particular, the UE performs (S66—FIG. 6) channel estimation based on received DM-RS for the PDCCH. This channel estimation uses the generated DM-RS sequence from before. As this generated DM-RS sequence is associated with the assumed transmission beam, e.g., beam #1, the channel estimation quality is poor (S67—FIG. 6) except for the received DM-RS which is also transmitted on the assumed transmission beam, e.g., transmission beam.

In case the channel estimation quality is found to be poor, the UE skips (S68—FIG. 6) the PDCCH decoding for the common search space set in this slot and directly proceeds to prepare for receiving PDCCH scheduling in the next slot. Thereby, the processing load can be significantly reduced in the UE.

In case the channel estimation quality is found to be sufficient, the UE performs (S69—FIG. 6) PDCCH decoding of PDCCH candidates of the common search space set. Although not depicted, the UE first demodulates each PDCCH candidate using the channel estimation.

Having decoded the PDCCH with the scheduling, the UE can subsequently receive (S70—FIG. 6) the RA response message via PDSCH.

As apparent from FIG. 7, the gNB combines the RAR messages from different UEs to thereby ensure a faster response time. In the depicted case, UE1 and UE2 are performing the random access channel procedure at a similar point in time. Thus, the gNB transmits a RAR message at the same time.

Since UE1 and UE2 are having different assumed transmission beams, e.g., beam #2 and beam #1 respectively, the association can ensure that only the UE1 and not the UE2 is decoding the PDCCH in the slot corresponding to beam #2, and that only the UE2 and not the UE1 is decoding the PDCCH in the slot corresponding to beam #1.

Second Exemplary Embodiment

Figure 8:
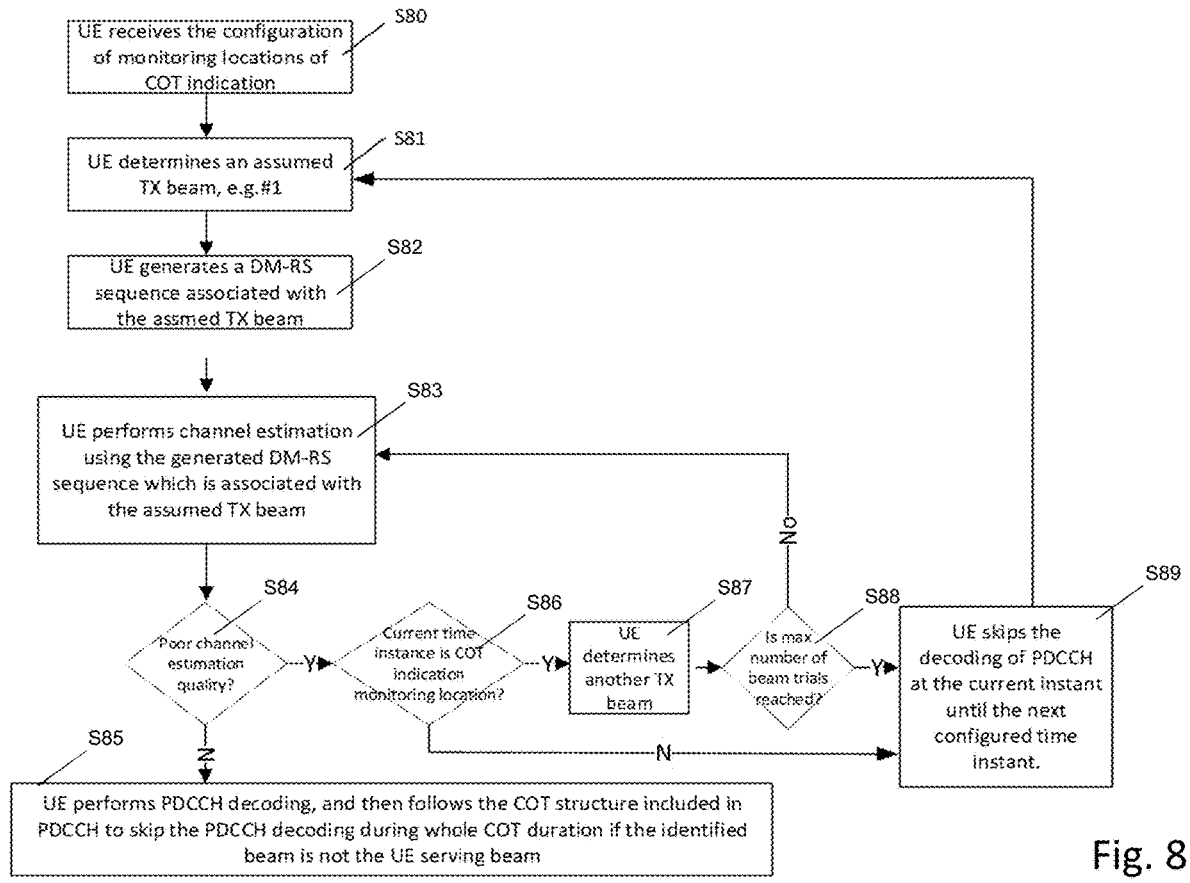
FIGS. 8 and 9 depict a flow diagram and a timing diagram of downlink control channel receptions according to a second exemplary embodiment.
Figure 9:
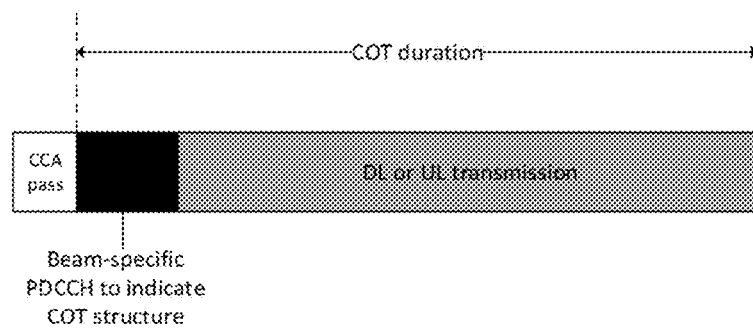

FIG. 8 depicts a flow diagram of downlink control channel (PDCCH) receptions according to a second exemplary embodiment whereas FIG. 9 shows a timing diagram of such downlink control channel receptions.

This second exemplary embodiment considers an unlicensed (NR-U) scenario, in particular where the channel occupation time (COT) concept is deployed as shown in FIG. 9.

As discussed before, the channel occupation time defines a maximum transmit duration during which an entity is transmitting on a given carrier without re-evaluating the availability of that carrier (i.e., LBT/CCA). This concept can be readily deployed for NR-U and advantageously combined with the improved PDCCH receptions.

In more detail, the UE receives (S80—FIG. 8) the configuration of monitoring locations for COT indications.

This configuration can be exemplarily received via higher layer signaling, e.g., RRC. The monitoring locations can be understood as common search space sets carrying DCIs, for example of DCI-Format 2_0, which are conveying an indication of a COT structure including an indication of the COT duration and of the transmission format, such as DL, UL and flexible symbols. As an example, the indication in DCI can point to an entry of a table which defines multiple possible structures of the COT.

Subsequently, the UE determines (S81—FIG. 8) an assumed transmission beam, generates (S82—FIG. 8) a DM-RS sequence associated with this assumed transmission beam, and performs (S83—FIG. 8) channel estimation using the generated DM-RS sequence to determine whether or not the channel estimation quality is poor (S84—FIG. 8)

In case a poor channel estimation quality (S84—FIG. 8) is determined for the UE's assumed transmission beam, and this occurs at current time instant which is not corresponding to such a COT indication monitoring location (S86—FIG. 8) the UE skips the decoding of PDCCH at the current time instant until the next configured time instant corresponding to the next monitoring location of COT indication.

In case a poor channel estimation quality (S84—FIG. 8) is determined for the UE's assumed transmission beam, and the current time instant is a time instant which is corresponding to a COT indication monitoring location (S86—FIG. 8), the UE performs channel estimation also using a different DM-RS sequence associated with another transmission beam (S87—FIG. 8), e.g., not the serving beam of the UE. Channel estimation is performed (S88—FIG. 8) as long as the maximum number of beam trials is reached.

Should one of the channel estimations with DM-RS associated with other transmission beams result in a suitable channel estimation quality, the UE performs (S85—FIG. 8) PDCCH decoding and then follows the COT structure of the indication. From this COT structure, the UE can infer the COT duration, and then skips PDCCH receptions during the entire COT duration.

In other words, the UE assumes that every transmission from the gNB is complying with the COT, and thus can be only present when it decodes a COT indication at the configured monitoring locations.

Then, should the channel estimation result in a poor channel estimation quality for another transmission beam (not the serving beam of the UE), it knows that all transmissions by the gNB during the entire COT duration are not intended for the UE but for a different UE, thus it can skip monitoring until the end of the COT structure. Thereby, the processing load at the UE is significantly reduced.

Third Exemplary Embodiment

Figure 10:
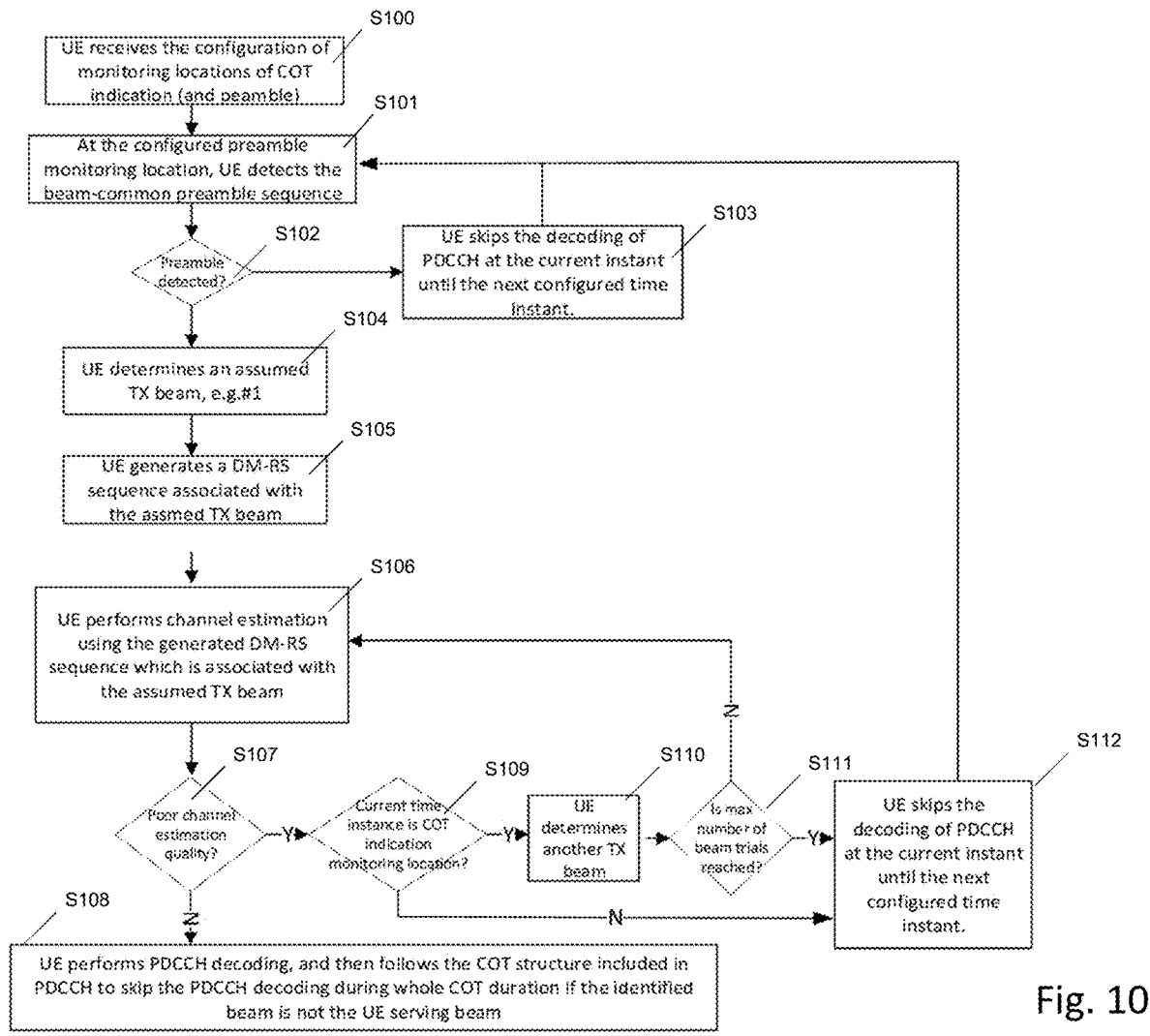
FIGS. 10-12 show a flow diagram and a timing diagram of downlink control channel receptions according to a third exemplary embodiment.
Figure 11:
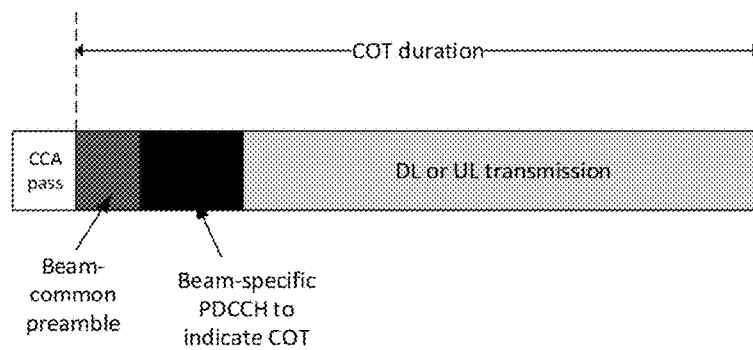

FIG. 10 depicts a flow diagram of downlink control channel (PDCCH) receptions according to a third exemplary embodiment whereas FIG. 11 shows a timing diagram of such downlink control channel receptions.

This third exemplary embodiment considers an unlicensed (NR-U) scenario, in particular where the channel occupation time (COT) concept is deployed, and where the beam specific transmissions by the gNB are preceded by a beam-common preamble (i.e., a preamble which is transmitted on every one of the plurality of transmission beams of the gNB) as illustrated in FIG. 11.

Such a beam common preamble can ensure compatibility of NR-U with other technologies in an unlicensed band and further improve the reliability of the COT detection by the UEs even under adverse propagation conditions.

In more detail, the UE receives (S100—FIG. 10) a configuration of monitoring locations for channel occupation time (COT) indications including a beam common preamble sequence at configured monitoring locations.

This configuration can be exemplarily received via higher layer signaling, e.g., RRC. The monitoring locations can be understood as common search space sets carrying DCIs, for example of DCI-Format 2_0, which are conveying an indication of a COT structure including an indication of the COT duration and of the transmission format, such as DL, UL and flexible symbols. As an example, the indication in DCI can point to an entry of a table which defines multiple possible structures of the COT.

At such a configured preamble monitoring location, the UE attempts to detect (S101—FIG. 10) the beam-common preamble sequence.

This detection does not necessarily include any PDCCH monitoring but instead can also result from power measurements at the configured location. Also different mechanism can be envisioned, for example, mechanisms which rely on a dedicated circuit configured for the sole purpose of detecting such preambles.

In case a preamble is detected (S102—FIG. 10), the UE proceeds to carry out the process which has already been described in connection with the second exemplary embodiment. For reasons of brevity, reference is only made to the according description of the individual steps in FIG. 8.

In case no preamble is detected (S102—FIG. 10), the UE skips the decoding of PDCCH at the current time instant until the next configured time instant. Thereby, the processing load at the UE is significantly reduced.

Figure 12:
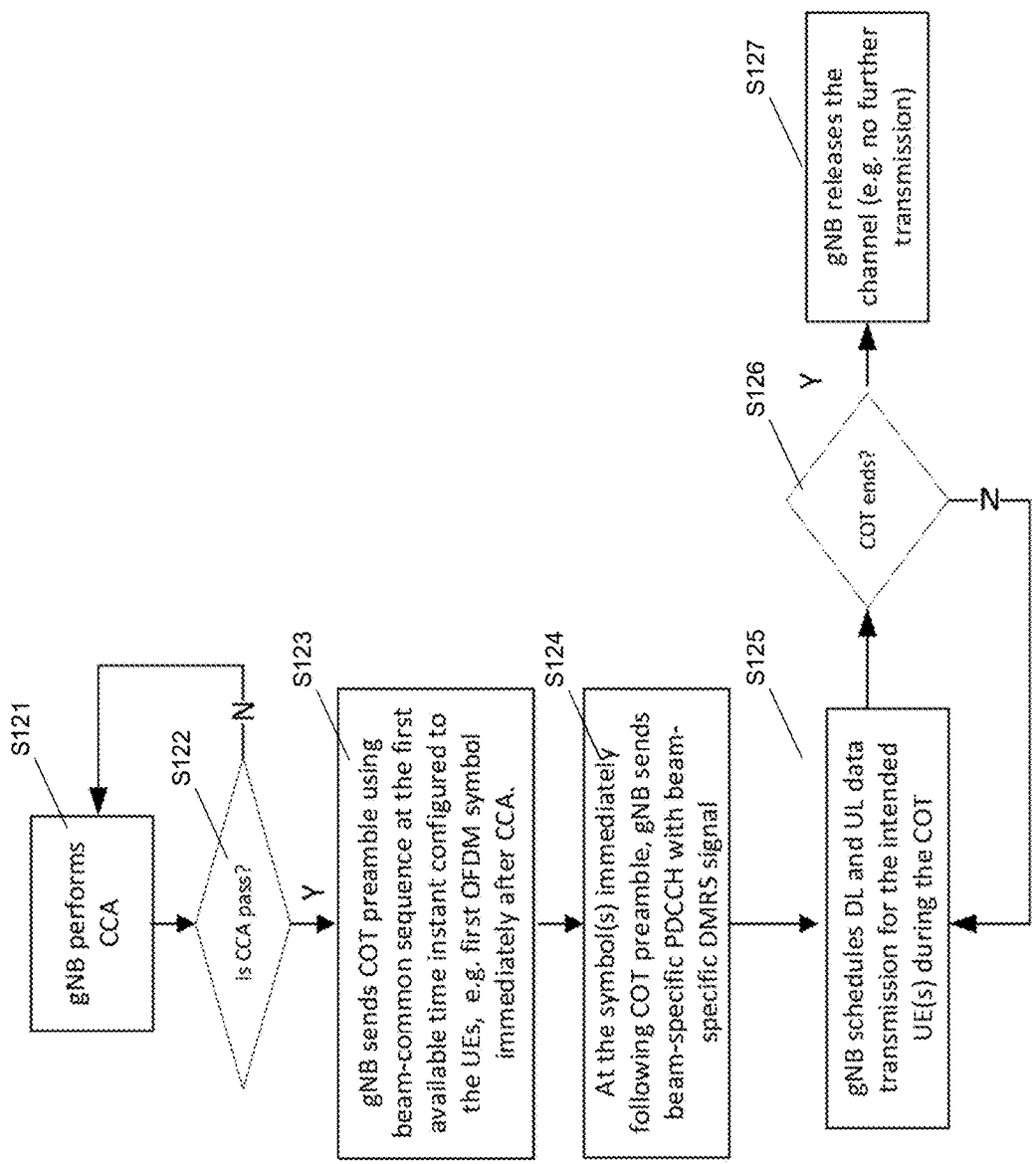

FIG. 12 depicts a flow diagram of downlink control channel (PDCCH) transmissions according to the third exemplary embodiment. This figure reflects the processing by the gNB.

In more detail, the gNB first performs (S121—FIG. 12) clear channel assessment (CCA) in unlicensed operation. If CCA is passed (S122—FIG. 12), the gNB sends (S123—FIG. 12) COT preamble using a beam-common sequence at the first available time instant configured in the UEs. This time instant may, for example, correspond to the first OFDM symbol immediately after CCA. At the symbol(s) immediately following the COT preamble, the gNB transmits (S124—FIG. 12) beam specific PDCCH with corresponding beam specific DM-RS signals.

With the PDCCH transmission, the gNB may schedule (S125—FIG. 12) downlink and uplink data transmission for the intended UE(s) during the COT. When the gNB finds that the COT duration elapsed (S126—FIG. 12), the gNB releases (S127—FIG. 12) the channel, e.g., the gNB performs no further transmissions.

Another Exemplary Implementation

Figure 13:
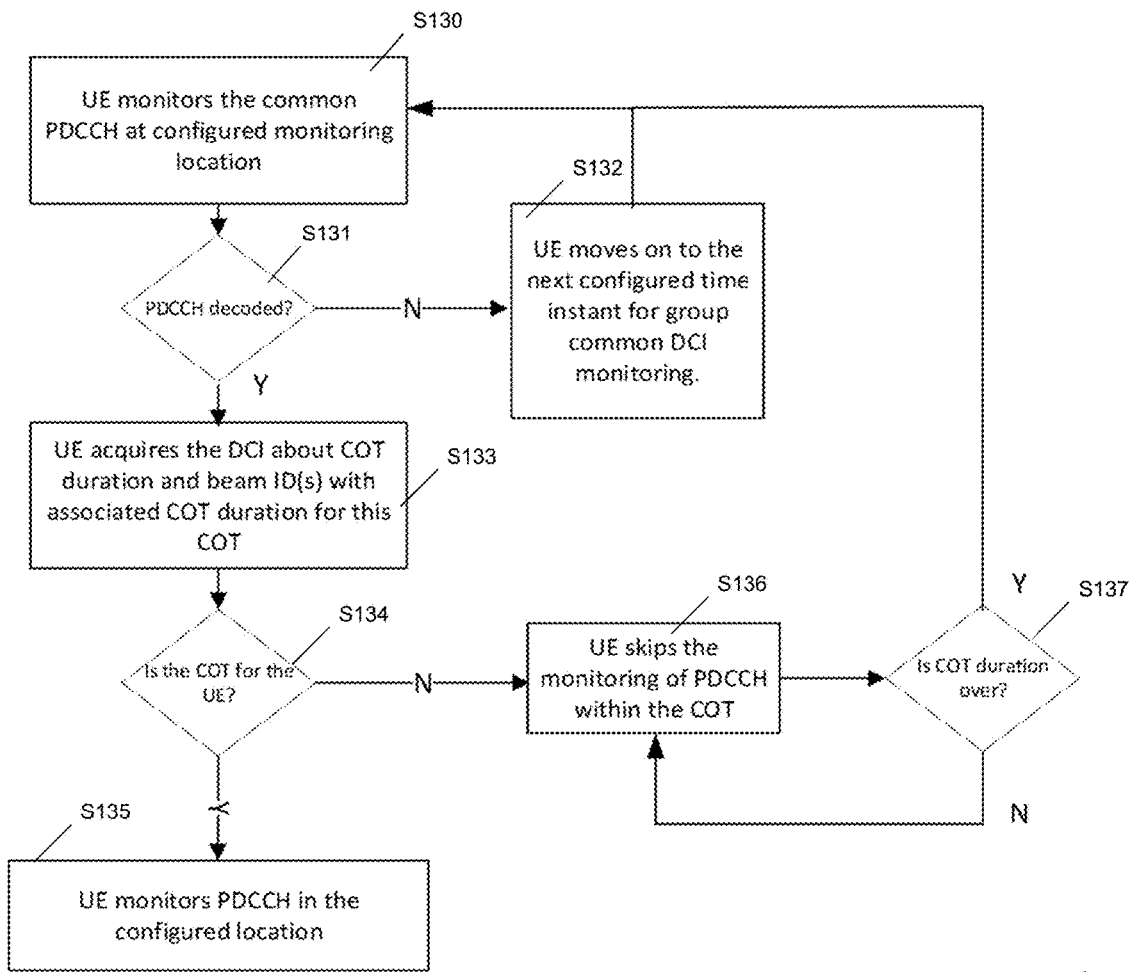
FIGS. 13 and 14 depict a flow diagram and a timing diagram of the mobile terminal and the base station according to another exemplary implementation.
Figure 14:
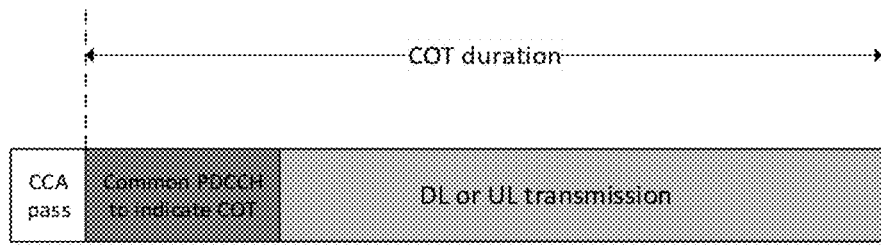

FIGS. 13 and 14 depict a flow diagram and a timing diagram of the mobile terminal and the base station according to another exemplary implementation. In this implementation the concepts previously discussed are further refined and permit a reduction of processing load even for mobile terminals which are intended to be addressed within a channel occupation time (COT) duration.

In this context, it is the general understanding that the mobile terminal is provided with information specifying a configuration of usage patterns for the channel by the base station. Such usage patterns can, for example, be a channel occupation time (COT) structure as shown in FIG. 14. However, the usage patterns shall not be understood as being restricted in this respect as there are more possibilities of configuring the channel usage.

For example, a substantial constraint for the base station results from the fact that the channel occupation time (COT) structure presently does not permit attributing different time periods (e.g., slots) within the COT duration to individual beam usages. To remedy this deficiency, it is possible to define the usage pattern as including an individual duration for each beam usage. This permits a more flexible scheduling.

Again, this is different from the COT structure. The COT structure merely identifies the COT duration and the transmission format (DL, UL or flexible symbols) to be used for the entire COT duration. In other words, within the COT duration included in the COT structure the base station will rely on dynamic scheduling via the downlink control channel for attributing different time periods to individual mobile terminals.

And with the dynamic scheduling, each mobile terminal, unless excluded from any receptions during the COT duration, will have to monitor the downlink control channel for downlink control channel candidates and demodulation reference signal transmissions which are transmitted using the assumed (serving) transmission beam.

For this purpose, new downlink control information (DCI) is defined which is to be transmitted by the base station in a search space which is common to a group of plural mobile terminals. The DCI includes at least a time duration for which the DCI is held to be valid, and an identification of the usage pattern which may include an individual duration for each beam usage. Optionally, it may also include an identification of the cell (Cell-ID) and/or at least a part of an identification of the network (PLMN-ID).

This usage pattern, in the context of the present disclosure, is defined as an identification of at least one of the plurality of transmission beams (tx-beam #1) which is being used by the base station for downlink control channel candidate (PDCCH candidate) and a corresponding demodulation reference signal (DM-RS) transmissions during at least a part of the time duration.

For example, in case the new downlink control information (DCI) includes an identification of two transmission beams, e.g., tx-beam #1 and tx-beam #2 then this downlink control information also includes an indication of the individual usage of each beams within the time duration for which the downlink control information is held to be valid.

In general, the usage pattern prescribes the transmission beams to be used for the control channel within the time duration for which the downlink control information is held to be valid, and thereby restricts control channel transmissions to only those mobile terminals for which the prescribed transmission beams facilitate a suitable channel estimation quality. As the downlink control channel is responsible for scheduling, the prescribed transmission beams accordingly restrict the communication to only specific mobile terminals.

Notably, this implementation also prescribes a specific signaling mechanism for transmission of the new downlink control information (new DCI) with the usage pattern. Rather than performing a downlink control channel transmissions in a conventional manner with different (narrow) beams with different directivity and/or coverage, the present disclosure foresees that the DCI is carried in a downlink control channel which is transmitted by the base station on a wide transmission beam.

This wide transmission beam is not intended to replace the different (narrow) transmission beams in the wireless communication system. Rather, it has been recognized by the inventors that the transmission of downlink control channels on common search spaces with different (narrow) transmission beam results in a complicated system design.

In this respect it is proposed to configure the base station with a single wide transmission beam (e.g., sector beam or omni-directional beam) which can convey downlink control channel transmission on common search spaces to multiple mobile terminals more easily. For example, the base station could be configured to include one wide transmission beam, e.g., beam #0, and plural (narrow) transmission beams, e.g., tx beams #1-#31

In the following, this wide beam usage for downlink control channel transmissions is said to use a specific format for the downlink control channel (PDCCH) transmissions. The specific format shall be understood as the format for carrying the new downlink control channel information (DCI) discussed above. Downlink control information (DCI) is generally conveyed using specific formats, thereby enabling an easy identification and decoding by the mobile terminal. This equally applies to the present case.

In an exemplary embodiment, the base station is configured to use specific time instances for a specific format of downlink control channel (PDCCH) and corresponding demodulation reference signal (DM-RS) transmissions to the mobile terminal with a specific wide transmission beam (tx-beam #0) which is different from the plurality of transmission beams. And the mobile terminal's processing circuitry is provided with information specifying said configuration.

Subsequently, the mobile terminal's transceiver receives (S130—FIG. 13) at a specific time instant (S131—FIG. 13) a downlink control channel candidate (PDCCH candidate) and a corresponding demodulation reference signal (DM-RS) of the specific format from the base station using one of the plurality of reception beams (rx-beam #0) suitable for receiving the specific wide transmission beam (tx-beam #0).

Then, the mobile terminal's processing circuitry performs (S133—FIG. 13) radio channel estimation based on the received demodulation reference signal (DM-RS) and, depending on a radio channel estimation quality, demodulates the downlink control channel candidate (PDCCH candidate) using the radio channel estimation, and decodes the demodulated downlink control channel candidate according to the specific format.

The specific format prescribes the decoded downlink control channel candidate to carry downlink control information including: a time duration for which the downlink control information is held to be valid, and an identification of at least one of the plurality of transmission beams (tx-beam #1) which is being used by the base station for downlink control channel candidate (PDCCH candidate) and a corresponding demodulation reference signal (DM-RS) transmissions during at least part of the time duration.

Finally, the mobile terminal's processing circuitry uses the identification (S134-FIG. 13) of at least one of the plurality of transmission beams (tx-beam #1) to generate demodulation reference signal sequences observing the association which are to be used (S135—FIG. 13) for performing channel estimation during the least part of the time duration for which the downlink control information is held to be valid.

Importantly, the mobile terminal's processing circuitry may also detect that the identification (S134—FIG. 13) of at least one of the plurality of transmission beams (tx-beam #1) does not include a suitable transmission beam for the mobile terminal to receive (e.g., not the assumed transmission beam). Then, the mobile terminal's processing circuitry skips (S136—FIG. 13) further monitoring of downlink control channels within the time duration for which the downlink control information element is held to be valid.

As already mentioned above, it is advantageous to attributing different time periods (e.g., slots) within the COT duration to individual beam usages. In this case, the processing load can be even reduced for mobile terminals which are intended to be addressed within the COT duration.

Further Aspects

According to a first aspect, a user equipment is provided, comprising a processing circuitry and transceiver. The processing circuitry assumes that a base station is configured to use for downlink control channel (PDCCH) and corresponding demodulation reference signal (DM-RS) transmissions to the mobile terminal one of a plurality of transmission beams (tx-beam #1). The transceiver receives a downlink control channel candidate (PDCCH candidate) and a corresponding demodulation reference signal (DM-RS) from the base station using one of a plurality of reception beams (rx-beam #1) corresponding to the assumed one of the plurality of transmission beams (tx-beam #1). The processing circuitry (130) performs radio channel estimation based on the received demodulation reference signal (DM-RS). The processing circuitry, depending on a radio channel estimation quality, demodulates the downlink control channel candidate (PDCCH candidate) using the radio channel estimation. The channel estimation is performed using a demodulation reference signal sequence which is generated observing an association which is associating the generated sequence with the assumed one of the plurality of transmission beams (tx-beam #1) such that at least two of the plurality of transmission beams are associated with different demodulation reference signal sequences.

According to a second aspect provided in addition to the first aspect, wherein performing the radio channel estimation includes:
  the processing circuitry (130), in operation, correlating the received demodulation reference signal (DM-RS) with the generated demodulation reference signal sequence, and
  the processing circuitry (130), in operation, determining a radio channel estimation quality based on the correlation result, In addition or alternatively, in case the radio channel estimation quality is below a threshold, the processing circuitry (130) does not demodulate the received downlink control channel candidate.

According to a third aspect provided in addition to the first or second aspect, the processing circuitry (130) generates the demodulation reference signal sequence from a base sequence (modified scrambling-ID) which includes:
  an identification of the assumed one of the plurality of transmission beams (tx-beam ID),
  such that the generated demodulation reference signal sequence is associated with the assumed one of the plurality of transmission beams (tx-beam #1).

According to a fourth aspect provided in addition to the third aspect, the processing circuitry (130) generates the demodulation reference signal sequence from the base sequence (modified scrambling-ID) which additionally includes at least one of:
  at least a part of an identification of the cell (Cell-ID) comprising the assumed transmission beam, and
  at least a part of an identification of the network (PLMN-ID) comprising the cell,
The at least parts of the identification of the cell or of the network correspond to a predetermined number of least significant bits of the respective identification.

According to a fifth aspect provided in addition to the third or fourth aspect, the processing circuitry (130) descrambles the demodulated downlink control channel candidate using the base sequence.

According to a sixth aspect provided in addition to any of the first, second and fifth aspects, the processing circuitry (130) generates the demodulation reference signal sequence from a base sequence corresponding to a scrambling identification (scrambling-ID) including using an orthogonal cover code which is associated with the assumed one of the plurality of transmission beams (tx-beam #1).

According to a seventh aspect provided in addition to any of the first, second and fifth aspects, the processing circuitry (130) generates the demodulation reference signal sequence from a base sequence corresponding to a scrambling identification (scrambling-ID) including applying a cyclic shift to the demodulation reference signal sequence corresponding to a cyclic shift value which is associated with the assumed one of the plurality of transmission beams (tx-beam #1).

According to an eighth aspect provided in addition to any of the first to seventh aspects, the demodulated downlink control channel candidate is included in a common search space carrying downlink control information (DCI) which is intended for a group of plural mobile terminals. The downlink control information (DCI) corresponds to at least DCI-Format 1-0 with a CRC scrambled with a random access radio network temporary identifier (RA-RNTI).

According to a ninth aspect provided in addition to any of the first to eighth aspects, the demodulated downlink control channel candidate is included in a common search space carrying downlink control information (DCI) which is intended for a group of plural mobile terminals. The downlink control information (DCI) corresponds to at least one of a DCI-Format 2_0 or any other DCI-format conveying indications of a channel occupation time (COT) structure with a CRC scrambled with a slot format radio network temporary identifier (SFI-RNTI).

According to a tenth aspect provided in addition to any of the first to ninth aspects, in case the transceiver (120) receives a configuration of monitoring locations for channel occupation time (COT) indications, the processing circuitry (130), in operation and at the monitoring locations:
 performs the channel estimation using the demodulation reference signal sequence which is associated with the assumed one of the plurality of transmission beams (tx-beam #1), and,
 additionally performs, in case the radio channel estimation quality is below a threshold, the channel estimation using a different demodulation reference signal sequence which is associated with another one of the plurality of transmission beams (tx-beam #2).

In case the radio channel estimation quality using the different demodulation reference signal sequence is above the threshold,
 the processing circuitry (130) demodulates the received downlink control channel (PDCCH) candidate and decodes the demodulated downlink control channel (PDCCH) candidate carrying downlink control information (DCI) conveying an indication of a channel occupation time (COT) structure, and
 the processing circuitry (130) configures the transceiver (120) to skip receiving any downlink control channel candidates (PDCCH candidate) and corresponding demodulation reference signals (DM-RS) from the base station for the remaining channel occupation time (COT) duration included in the channel occupation time (COT) structure.

According to an eleventh aspect provided in addition to the tenth aspect, the transceiver (120) receives a configuration of monitoring locations for the channel occupation time (COT) indications including a beam common preamble sequence at configured monitoring locations.

According to a twelfth aspect provided in addition to any one of the first to eleventh aspects, the processing circuitry (130) is provided with information specifying that the base station is configured to use specific time instances for a specific format of downlink control channel (PDCCH) and corresponding demodulation reference signal (DM-RS) transmissions to the mobile terminal with a specific wide transmission beam (tx-beam #0) which is different from the plurality of transmission beams. The transceiver (120) receives at a specific time instant a downlink control channel candidate (PDCCH candidate) of the specific format and a corresponding demodulation reference signal (DM-RS) from the base station using one of the plurality of reception beams (rx-beam #0) suitable for receiving the specific wide transmission beam (tx-beam #0). The processing circuitry (130) performs radio channel estimation based on the received demodulation reference signal (DM-RS) and, depending on a radio channel estimation quality, demodulates the downlink control channel candidate (PDCCH candidate) using the radio channel estimation, and decodes the demodulated downlink control channel candidate according to the specific format. The specific format prescribes the decoded downlink control channel candidate to carry downlink control information including:
 a time duration for which the downlink control information is held to be valid, and
 an identification of at least one of the plurality of transmission beams (tx-beam #1) which is being used by the base station for downlink control channel candidate (PDCCH candidate) and a corresponding demodulation reference signal (DM-RS) transmissions during at least a part of the time duration The processing circuitry (130) uses the identification of at least one of the plurality of transmission beams (tx-beam #1) to generate demodulation reference signal sequences in relation to the association which are to be used for performing channel estimation during the at least a part of the time duration.

According to a thirteenth aspect, a base station is provided, comprising processing circuitry and a transceiver. The processing circuitry (180) assumes that the mobile terminal is configured to use for downlink control channel (PDCCH) and corresponding demodulation reference signal (DM-RS) receptions at the mobile terminal one of a plurality of reception beams (tx-beam #1). The transceiver (170) transmits a downlink control channel (PDCCH) and corresponding demodulation reference signal (DM-RS) to the mobile terminal using one of a plurality of transmission beams (tx-beam #1) corresponding to the assumed one of the plurality of reception beams (tx-beam #1). The processing circuitry (180) modulates the downlink control channel (PDCCH) to be transmitted and generates a demodulation reference signal sequence to be transmitted as the corresponding demodulation reference signal (DMRS). The demodulation reference signal sequence is generated observing an association which is associating the generated sequence with the one of the plurality of transmission beams (tx-beam #1) such that at least two of the plurality of transmission beams are associated with different demodulation reference signal sequences.

According to a fourteenth aspect, a reception method for a mobile terminal is provided. The mobile terminal assumes that a base station is configured to use for downlink control channel (PDCCH) and corresponding demodulation reference signal (DM-RS) transmissions to the mobile terminal one of a plurality of transmission beams (tx-beam #1). The mobile terminal receives a downlink control channel candidate (PDCCH candidate) and a corresponding demodulation reference signal (DM-RS) from the base station using one of a plurality of reception beams (rx-beam #1) corresponding to the assumed one of the plurality of transmission beams (tx-beam #1). The mobile terminal performs radio channel estimation based on the received demodulation reference signal (DM-RS) and, depending on a radio channel estimation quality, demodulates the downlink control channel candidate (PDCCH candidate) using the radio channel estimation. The channel estimation is performed using a demodulation reference signal sequence which is generated observing an association which is associating the generated sequence with the assumed one of the plurality of transmission beams (tx-beam #1) such that at least two of the plurality of transmission beams are associated with different demodulation reference signal sequences.

According to a fifteenth aspect, a transmission method for a base station is provided. The base station assumes that the mobile terminal is configured to use for downlink control channel (PDCCH) and corresponding demodulation reference signal (DM-RS) receptions at the mobile terminal one of a plurality of reception beams (tx-beam #1). The base station transmits a downlink control channel (PDCCH) and corresponding demodulation reference signal (DM-RS) to the mobile terminal using one of a plurality of transmission beams (tx-beam #1) corresponding to the assumed one of the plurality of reception beams (tx-beam #1). The base station modulates the downlink control channel (PDCCH) to be transmitted and generates a demodulation reference signal sequence to be transmitted as the corresponding demodulation reference signal (DMRS). The demodulation reference signal sequence is generated observing an association which is associating the generated sequence with the one of the plurality of transmission beams (tx-beam #1) such that at least two of the plurality of transmission beams are associated with different demodulation reference signal sequences.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs.

The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used.

The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A mobile terminal comprising:
a processing circuitry which, in operation, assumes that a base station is configured to use for downlink control channel and corresponding demodulation reference signal transmissions to the mobile terminal one of a plurality of transmission beams; and
a transceiver which, in operation, receives a downlink control channel candidate and a corresponding demodulation reference signal from the base station using one of a plurality of reception beams corresponding to the assumed one of the plurality of transmission beams;
wherein, the processing circuitry, in operation, performs radio channel estimation based on the received demodulation reference signal and, depending on a radio channel estimation quality, demodulates the downlink control channel candidate using the radio channel estimation,
wherein, the channel estimation is performed using a demodulation reference signal sequence which is generated observing an association which is associating the generated sequence with the assumed one of the plurality of transmission beams such that at least two of the plurality of transmission beams are associated with different demodulation reference signal sequences,
wherein, in case the transceiver receives a configuration of monitoring locations for channel occupation time indications, the processing circuitry, in operation and at the monitoring locations:
performs the channel estimation using the demodulation reference signal sequence which is associated with the assumed one of the plurality of transmission beams; and
additionally performs, in case the radio channel estimation quality is below a threshold, the channel estimation using a different demodulation reference signal sequence which is associated with another one of the plurality of transmission beams,
wherein, in case the radio channel estimation quality using the different demodulation reference signal sequence is above the threshold,
the processing circuitry, in operation, demodulates the received downlink control channel candidate and decodes the demodulated downlink control channel candidate carrying downlink control information conveying an indication of a channel occupation time structure; and
the processing circuitry, in operation, configures the transceiver to skip receiving any downlink control channel candidates and corresponding demodulation reference signals from the base station for the remaining channel occupation time duration included in the channel occupation time structure.

2. The mobile terminal according to claim 1, wherein performing the radio channel estimation includes:
the processing circuitry correlating the received demodulation reference signal with the generated demodulation reference signal sequence; and
the processing circuitry determining a radio channel estimation quality based on the correlation result, and/or wherein, in case the radio channel estimation quality is below a threshold, the processing circuitry does not demodulate the received downlink control channel candidate.

3. The mobile terminal according to claim 1, wherein the processing circuitry, in operation, generates the demodulation reference signal sequence from a base sequence which includes:
an identification of the assumed one of the plurality of transmission beams,
such that the generated demodulation reference signal sequence is associated with the assumed one of the plurality of transmission beams.

4. The mobile terminal according to claim 3, wherein the processing circuitry, in operation, generates the demodulation reference signal sequence from the base sequence which additionally includes at least one of:
at least a part of an identification of the cell comprising the assumed transmission beam; and
at least a part of an identification of the network comprising the cell;
wherein, the at least parts of the identification of the cell or of the network correspond to a predetermined number of least significant bits of the respective identification.

5. The mobile terminal according to claim 3, wherein the processing circuitry, in operation, de-scrambles the demodulated downlink control channel candidate using the base sequence.

6. The mobile terminal according to claim 1, wherein the processing circuitry, in operation, generates the demodulation reference signal sequence from a base sequence corresponding to a scrambling identification including using an orthogonal cover code which is associated with the assumed one of the plurality of transmission beams.

7. The mobile terminal according to claim 1, wherein the processing circuitry, in operation, generates the demodulation reference signal sequence from a base sequence corresponding to a scrambling identification including applying a cyclic shift to the demodulation reference signal sequence corresponding to a cyclic shift value which is associated with the assumed one of the plurality of transmission beams.

8. The mobile terminal according to claim 1, wherein the demodulated downlink control channel candidate is included in a common search space carrying downlink control information which is intended for a group of plural mobile terminals, and
the downlink control information corresponds to at least DCI-Format 1-0 with a CRC scrambled with a random access radio network temporary identifier.

9. The mobile terminal according to claim 1, wherein
the demodulated downlink control channel candidate is included in a common search space carrying downlink control information which is intended for a group of plural mobile terminals, and
the downlink control information corresponds to at least one of a DCI-Format 2_0 or any other DCI-format conveying indications of a channel occupation time structure with a CRC scrambled with a slot format radio network temporary identifier.

10. The mobile terminal according to claim 1, wherein, the transceiver, in operation, receives the configuration of monitoring locations for channel occupation time indications including a beam common preamble sequence at configured monitoring locations.

11. The mobile terminal according to claim 1, wherein:
the processing circuitry, in operation, is provided with information specifying that the base station is configured to use specific time instances for a specific format of downlink control channel and corresponding demodulation reference signal transmissions to the mobile terminal with a specific wide transmission beam which is different from the plurality of transmission beams;
the transceiver, in operation, receives at a specific time instant a downlink control channel candidate of the specific format and a corresponding demodulation reference signal from the base station using one of the plurality of reception beams suitable for receiving the specific wide transmission beam; and
the processing circuitry, in operation, performs radio channel estimation based on the received demodulation reference signal and, depending on a radio channel estimation quality, demodulates the downlink control channel candidate using the radio channel estimation, and decodes the demodulated downlink control channel candidate according to the specific format,
wherein the specific format prescribes the decoded downlink control channel candidate to carry downlink control information including:
a time duration for which the downlink control information is held to be valid; and
an identification of at least one of the plurality of transmission beams which is being used by the base station for downlink control channel candidate and a corresponding demodulation reference signal transmissions during at least a part of the time duration,
wherein the processing circuitry uses the identification of at least one of the plurality of transmission beams to generate demodulation reference signal sequences in relation to the association which are to be used for performing channel estimation during the at least a part of the time duration.

12. A base station, comprising:
a processing circuitry which, in operation, assumes that a mobile terminal is configured to use for downlink control channel and corresponding demodulation reference signal receptions at the mobile terminal one of a plurality of reception beams; and
a transceiver which, in operation, transmits a downlink control channel and a corresponding demodulation reference signal to the mobile terminal using one of a plurality of transmission beams corresponding to the assumed one of the plurality of reception beams;
wherein, the processing circuitry, in operation, modulates the downlink control channel to be transmitted and generates a demodulation reference signal sequence to be transmitted as the corresponding demodulation reference signal,
wherein, the demodulation reference signal sequence is generated observing an association which is associating the generated sequence with the one of the plurality of transmission beams such that at least two of the plurality of transmission beams are associated with different demodulation reference signal sequences,
wherein, the transceiver transmits a configuration of monitoring locations for channel occupation time indications,
wherein the monitoring locations are configured for the mobile terminal to perform radio channel estimation using the demodulation reference signal sequence which is associated with the assumed one of the plurality of transmission beams and additionally using a different demodulation reference signal sequence which is associated with another one of the plurality of transmission beams, and
wherein the downlink control channel carries downlink control information conveying an indication of a channel occupation time structure for use by the mobile terminal to skip receiving any downlink control channels and corresponding demodulation reference signals from the base station for the remaining channel occupation time duration included in the channel occupation time structure.

13. A reception method for a mobile terminal, comprising:
assuming that a base station is configured to use for downlink control channel and corresponding demodulation reference signal transmissions to the mobile terminal one of a plurality of transmission beams;
receiving a downlink control channel candidate and a corresponding demodulation reference signal from the base station using one of a plurality of reception beams corresponding to the assumed one of the plurality of transmission beams;
performing radio channel estimation based on the received demodulation reference signal and, depending on a radio channel estimation quality, demodulating the downlink control channel candidate using the radio channel estimation,
wherein, the channel estimation is performed using a demodulation reference signal sequence which is generated observing an association which is associating the generated sequence with the assumed one of the plurality of transmission beams such that at least two of the plurality of transmission beams are associated with different demodulation reference signal sequences;
receiving a configuration of monitoring locations for channel occupation time indications;
performing, at the monitoring locations, the channel estimation using the demodulation reference signal sequence which is associated with the assumed one of the plurality of transmission beams;
additionally performing at the monitoring locations, in case the radio channel estimation quality is below a threshold, the channel estimation using a different demodulation reference signal sequence which is associated with another one of the plurality of transmission beams;
in case the radio channel estimation quality using the different demodulation reference signal sequence is above the threshold, demodulating the received downlink control channel candidate and decoding the demodulated downlink control channel candidate carrying downlink control information conveying an indication of a channel occupation time structure; and
configuring to skip receiving any downlink control channel candidates and corresponding demodulation reference signals from the base station for the remaining channel occupation time duration included in the channel occupation time structure.

14. A transmission method for a base station, comprising
assuming that a mobile terminal is configured to use for downlink control channel and corresponding demodulation reference signal receptions at the mobile terminal one of a plurality of reception beams;
transmitting a downlink control channel and a corresponding demodulation reference signal to the mobile terminal using one of a plurality of transmission beams corresponding to the assumed one of the plurality of reception beams;

modulating the downlink control channel to be transmitted and generating a demodulation reference signal sequence to be transmitted as the corresponding demodulation reference signal, wherein, the demodulation reference signal sequence is generated observing an association which is associating the generated sequence with the one of the plurality of transmission beams such that at least two of the plurality of transmission beams are associated with different demodulation reference signal sequences, transmitting a configuration of monitoring locations for channel occupation time indications, wherein the monitoring locations are configured for the mobile terminal to perform radio channel estimation using the demodulation reference signal sequence which is associated with the assumed one of the plurality of transmission beams and additionally using a different demodulation reference signal sequence which is associated with another one of the plurality of transmission beams, and wherein the downlink control channel carries downlink control information conveying an indication of a channel occupation time structure for use by the mobile terminal to skip receiving any downlink control channels and corresponding demodulation reference signals from the base station for the remaining channel occupation time duration included in the channel occupation time structure.

* * * * *